US010176438B2

(12) United States Patent
Shakarian et al.

(10) Patent No.: US 10,176,438 B2
(45) Date of Patent: Jan. 8, 2019

(54) SYSTEMS AND METHODS FOR DATA DRIVEN MALWARE TASK IDENTIFICATION

(71) Applicants: ARIZONA BOARD OF REGENTS ON BEHALF OF ARIZONA STATE UNIVERSITY, Tempe, AZ (US); CARNEGIE MELLON UNIVERSITY, Pittsburgh, PA (US)

(72) Inventors: Paulo Shakarian, Chandler, AZ (US); Eric Nunes, Tempe, AZ (US); Casey Buto, Painted Post, NY (US); Christian Lebiere, Pittsburgh, PA (US); Robert Thomson, Alexandria, VA (US); Stefano Bennati, Zurich (CH)

(73) Assignees: Arizona Board of Regents on Behalf of Arizona State University, Tempe, AZ (US); Carnegie Mellon University, Pittsburgh, PA (US)

( * ) Notice: Subject to any disclaimer, the term of this patent is extended or adjusted under 35 U.S.C. 154(b) by 175 days.

(21) Appl. No.: 15/186,278

(22) Filed: Jun. 17, 2016

(65) Prior Publication Data
US 2016/0371490 A1 Dec. 22, 2016

Related U.S. Application Data

(60) Provisional application No. 62/182,003, filed on Jun. 19, 2015.

(51) Int. Cl.
*G06F 21/56* (2013.01)
*G06N 99/00* (2010.01)
*G06F 21/55* (2013.01)

(52) U.S. Cl.
CPC ........ *G06N 99/005* (2013.01); *G06F 21/552* (2013.01); *G06F 21/562* (2013.01)

(58) Field of Classification Search
None
See application file for complete search history.

(56) References Cited

U.S. PATENT DOCUMENTS

| 8,578,497 B2 | 11/2013 | Antonakakis et al. |
| 8,839,434 B2 | 9/2014 | McDougal et al. |
| (Continued) | | |

FOREIGN PATENT DOCUMENTS

| WO | 2013184501 A1 | 12/2013 |
| WO | 2014124806 A1 | 8/2014 |
| (Continued) | | |

OTHER PUBLICATIONS

Thomson, Robert et al., Human, Model and Machine: A Complementary Approach to Big Data. 1st Workshop on Human-Centered Big Data Research. [online], Apr. 1-3, 2014 [retrieved on Feb. 18, 2018]. Retrieved from the Internet:< URL: http:// delivery.acm . org >. (Year: 2014).*

(Continued)

*Primary Examiner* — Malcolm Cribbs
(74) *Attorney, Agent, or Firm* — Polsinelli PC

(57) ABSTRACT

Embodiments of a system and method for identifying malware tasks using a controlled environment to run malicious software to generate analysis reports, a parser to extract features from the analysis reports and a cognitively inspired learning algorithm to predict tasks associated with the malware are disclosed.

9 Claims, 14 Drawing Sheets

(56) References Cited

U.S. PATENT DOCUMENTS

| | | | |
|---|---|---|---|
| 8,984,632 B1 | 3/2015 | Laffoon et al. | |
| 2011/0154495 A1 | 6/2011 | Stranne | |
| 2012/0096554 A1 | 4/2012 | Stranne | |
| 2012/0304244 A1* | 11/2012 | Xie | G06F 21/00 726/1 |
| 2013/0139261 A1* | 5/2013 | Friedrichs | G06F 21/00 726/23 |
| 2013/0291111 A1* | 10/2013 | Zhou | G06F 21/566 726/23 |
| 2013/0326476 A1 | 12/2013 | Wyatt et al. | |
| 2014/0053266 A1* | 2/2014 | Wang | G06F 21/50 726/22 |
| 2014/0090061 A1* | 3/2014 | Avasarala | G06F 21/56 726/24 |
| 2014/0115703 A1 | 4/2014 | Penton et al. | |
| 2014/0259168 A1 | 9/2014 | McNamee et al. | |
| 2014/0283037 A1* | 9/2014 | Sikorski | G06F 21/563 726/22 |
| 2014/0283076 A1 | 9/2014 | Muttik | |
| 2014/0298469 A1* | 10/2014 | Marion | G06F 21/55 726/23 |
| 2014/0359761 A1 | 12/2014 | Altman et al. | |
| 2015/0058987 A1 | 2/2015 | Thure et al. | |
| 2015/0067862 A1 | 3/2015 | Yu et al. | |
| 2015/0074812 A1 | 3/2015 | Freeman et al. | |
| 2015/0096029 A1 | 4/2015 | Johnson et al. | |
| 2015/0101049 A1 | 4/2015 | Lukacs et al. | |
| 2016/0277423 A1* | 9/2016 | Apostolescu | H04L 63/145 |
| 2016/0335435 A1* | 11/2016 | Schmidtler | G06F 21/565 |
| 2017/0098074 A1* | 4/2017 | Okano | G06F 21/56 |

FOREIGN PATENT DOCUMENTS

| | | | |
|---|---|---|---|
| WO | 2015047803 A1 | 4/2015 | |
| WO | 2015047804 A1 | 4/2015 | |
| WO | 2015047960 A1 | 4/2015 | |

OTHER PUBLICATIONS

J. R. Anderson, D. Bothell, M. D. Byrne, S. Douglass, C. Lebiere, and Y. Qin. An integrated theory of mind. Psychological Review, 111:1036-1060, 2004.

U. Bayer, P. M. Comparetti, C. Hlauschek, C. Kruegel, and E. Kirda. Scalable, behavior-based malware clustering. 2009.

L. Breiman. Random forests. Machine Learning, 45(1):5-32, 2001.

C.-C. Chang and C.-J. Lin. Libsvm: A library for support vector machines. ACM Trans. Intell. Syst. Technol., 2(3):27:1-27:27, May 2011.

C. Cortes and V. Vapnik. Support-vector networks. pp. 273-297, 1995.

I. Firdausi, C. lim, A. Erwin, and A. S. Nugroho. Analysis of machine learning techniques used in behavior-based malware detection. In Proceedings of the 2010 Second International Conference on ACT, ACT '10, pp. 201-203, Washington, DC, USA, 2010. IEEE Computer Society.

C. Gonzalez, J. F. Lerch, and C. Lebiere. Instance-based learning in dynamic decision making. Cognitive Science, 27(4):591-635, 2003.

J. Kinable and O. Kostakis. Malware clasiffication based on call graph clustering. J. Comput. Virol., 7(4):233-245, Nov. 2011.

D. Kong and G. Yan. Discriminant malware distance learning on structural information for automated malware clasiffication. In Proceedings of the 19th ACM SIGKDD, KDD '13, pp. 1357-1365, New York, NY, USA, 2013. ACM.

C. Lebiere, S. Bennati, R. Thomson, P. Shakarian, and E. Nunes. Functional cognitive models of malware identfication. In Proceedings of ICCM, ICCM 2015, Groningen, The Netherlands, Apr. 9-11, 2015, 2015.

C. Lebiere, P. Pirolli, R. Thomson, J. Paik, M. Rutledge-Taylor, J. Staszewski, and J. R. Anderson. A functional model of sensemaking in a neurocognitive architecture. Intell. Neuroscience, 2013:5:5-5:5, Jan. 2013.

P. Li, L. Liu, and M. K. Reiter. On challenges in evaluating malware clustering, 2007.

R. Perdisci and M. U. Vamo: towards a fully automated malware clustering validity analysis. In ACSAC, pp. 329-338. ACM, 2012.

A. Tamersoy, K. Roundy, and D. H. Chau. Guilt by association: Large scale malware detection by mining _le-relation graphs. In Proceedings of the 20th ACM SIGKDD, KDD '14, pp. 1524-1533. ACM, 2014.

T. J. Wong, E. T. Cokely, and L. J. Schooler. An online database of act-r parameters: Towards a transparent community-based approach to model development, 2010.

Nunes, E., Buto, C., Shakarian, P., Lebiere, C., Bennati, S., Thomson, R., & Jaenisch, H. (Aug. 2015). Malware task identification: A data driven approach. In Proceedings of the 2015 IEEE/ACM International Conference on Advances in Social Networks Analysis and Mining 2015 (pp. 978-985). ACM.

M. Lindorfer, C. Kolbitsch, and P. Milani Comparetti. Detecting environment-sensitive malware. In Proceedings of the 14th International Conference on RAID, RAID'11, pp. 338-357, Berlin, Heidelberg, 2011. Springer-Verlag.

R. Thomson, C. Lebiere, S. Bennati, P. Shakarian, and E. Nunes. Malware identification using cognitively-inspired inference. In Proceedings of BRIMS, BRIMS 2015, Washington DC, Mar. 31-Apr. 3, 2015, 2015.

\* cited by examiner (a) $\tau = -20$ (b) $\tau = -10$ (c) $\tau = 0$ (d) $\tau = 5$ (e) $\tau = 10$ (f) $\tau = 15$

SYSTEMS AND METHODS FOR DATA DRIVEN MALWARE TASK IDENTIFICATION

CROSS REFERENCE TO RELATED APPLICATIONS

This is a non-provisional application that claims benefit to U.S. provisional application Ser. No. 62/182,003 filed on Jun. 19, 2015, which is herein incorporated by reference in its entirety.

This invention was made with government support under D10PC20021 awarded by IARPA. The Government has certain rights in the invention.

FIELD

The present disclosure generally relates to malware task identification, and in particular to an automated method for identifying malware tasks using a sandbox environment to run malicious software to generate analysis reports, a parser to extract features from the analysis reports, and a cognitively inspired learning algorithm to predict tasks associated with the malware.

BACKGROUND

Identifying the tasks a given piece of malware was designed to perform (logging keystrokes, recording video, establishing remote access, etc.) is a difficult and time consuming task that is largely human-driven in practice. The complexity of this task increases substantially when you consider that malware is constantly evolving, and that how each malware instance is classified may be different based on each cyber-security expert's own particular background. However, automated solutions are highly attractive for this problem as it can significantly reduce the time it takes to conduct remediation in the aftermath of a cyber-attack.

Earlier work has sought to classify malware by similar "families" which has been explored as a supervised classification problem. However, differences over "ground truth" for malware families (i.e. Symantec and MacAfee cluster malware into families differently) and the tendency for automated approaches to primarily succeed at "easy to classify" samples are two primary drawbacks of malware family classification. More recently, there has been work on directly inferring the tasks a malware was designed to perform. This approach leverages static malware analysis (i.e. analysis of the malware sample conducted without execution, such as decompilation) and a comparison with a crowd-source database of code snippets using a proprietary machine leaning approach. However, a key shortcoming of the static method is that it is of limited value when the malware authors encrypt part of their code—as we saw with the infamous Gauss malware. This work builds upon recent developments in the application of cognitive models to intelligence analysis tasks and our own preliminary studies on applying cognitive models to identify the tasks a piece of malware was designed to perform.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
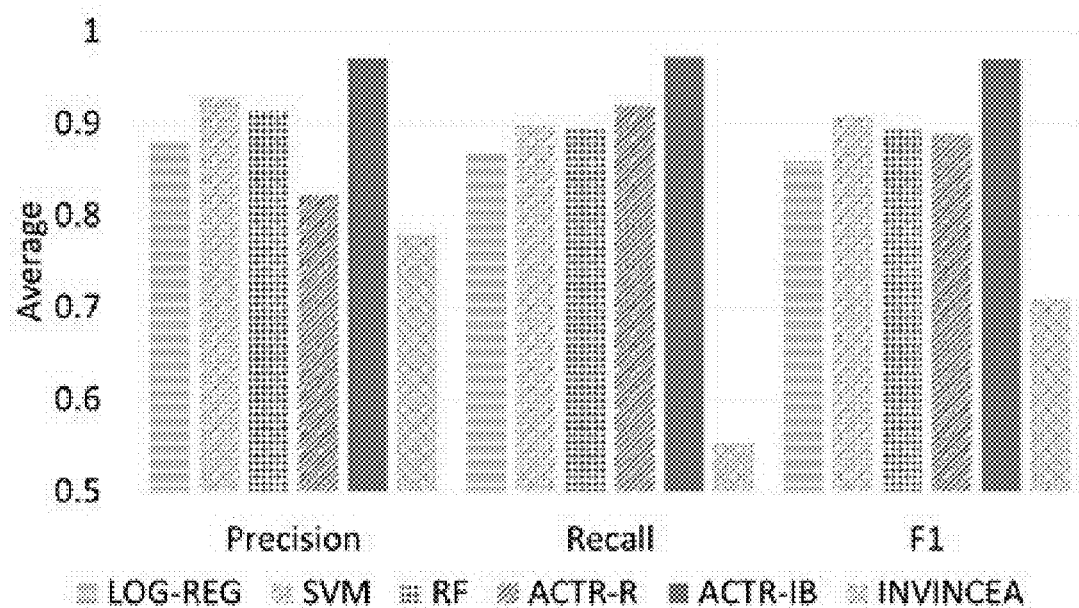
FIG. 1 is a graph illustrating Precision, Recall and F1 comparisons for LOG-REG, RF, SVM, ACTR-R, ACTR-IB, and INVINCEA.

Throughout this disclosure, it shall be assumed that a set of malware samples comprise a historical corpus (denoted M) and each sample i∈M is associated with a set of tasks (denoted tasks(i)) and a set of attributes (denoted attribs(i)). Attributes are essentially binary features associated with a piece of malware that can be observed using dynamic and/or static analysis while the tasks—which tell the higher-level purpose of the malware—is determined by a human reviewing the results of such analysis. As M comprises our historical knowledge, it is also assumed that for each i∈M both tasks(i) and attribs(i) are known. For a new piece of malware, it shall be assumed that only the attributes are known. The notation |•| will be used to denote the size of a given set.

Tables 1 and 2 provide examples of the attributes and tasks based on the malware samples from the Mandiant APT1 dataset.

Throughout this disclosure, malware families will be considered using the symbol F to denote the set of all families. Each malware sample will belong to one malware family, and all malware samples belonging to a given family will have the same set of tasks. Hence, each element of F will be considered as a subset of M.

TABLE 1

Attributes extracted through automated malware analysis.

| Attribute | Intuition |
| --- | --- |
| hasDynAttrib | Malware has a generic attribute determined in the analysis |
| usesDll(X) | Malware uses a library X |
| regAct(K) | Malware conducts an activity in the registry, modifying key K. |
| fileAct(K) | Malware conducts an activity on a certain file |
| proAct | Malware initiates or terminates a process |

TABLE 2

Sample of malware tasks.

| Task | Intuition |
| --- | --- |
| Beacon | Beacons back to the adversary's system |
| enumFiles | Designed to enumerate files on the target |
| servieManip | Manipulates services running on the target |
| takeScreenShots | Takes screen shots |
| Upload | Designed to upload files from the target |

Cognitively-Inspired Inference

While human inference has memory and attention limitations, their cognitive processes are powerful, where adaptive heuristic strategies are adopted to accomplish the tasks under strong time constraints using limited means. An advantage of using a cognitive model to describe inferential processes is that the underling architecture provides the benefits of human-inspired inference while allowing for more flexibility over constraints such as human working memory. There appears to be a valid use of cognitive architectures for artificial intelligence that makes use of basic cognitive mechanisms while not necessarily making use of all constraints of the architecture. Previous studies introduced a modeling methodology called accountable modeling that recognizes that not every aspect of a cognitive model is reflected in measurable performance. In that case, it is arguably better to specifically state which aspects of the model are not constrained by data, and rather than mock up those aspects in plausible but impossible to validate manner, simply treat them as unmodeled processes. This approach results in simpler models with a clear link between mechanisms used and results accounted for, rather than being obscured by complex but irrelevant machinery. For instance, while the models described in this disclosure use activation dynamics well-justified against human behavioral and neural data to account for features such as temporal discounting, the present disclosure may not directly model working memory constraints to allow for more features of malware and more instances to be present in memory.

ACT-R Based Approaches

Two models have been built using the mechanisms of the ACT-R (Adaptive Control of Thought-Rational) cognitive architecture. These models leverage the work on applying this architecture to intelligence analysis problems. In particular, the recently-introduced instance-based (ACTR-IB) and rule-based (ACTR-R) models are leveraged. Previous research has argued that the ability of instance-based learning in complex dynamic situations making it appropriate for sensemaking. On the other hand the rule-based learning is a more compact representation of associating samples in memory with their respective families. In this section, some of the major concepts of the ACT-R framework are reviewed that are relevant to these models and provide a description of both approaches. The features of the declarative memory are leveraged and production system of the ACT-R architecture to complete malware task identification. These systems store and retrieve information that corresponds to declarative and procedural knowledge, respectively. Declarative information is the knowledge that a person can attend to, reflect upon, and usually articulate in some way (e.g., by declaring it verbally or by gesture). Conversely, procedural knowledge consists of the skills that are displayed in our behavior, generally without conscious awareness.

Declarative Knowledge: Declarative knowledge is represented formally in terms of chunks. Chunks have an explicit type, and consist of an ordered list of slot-value pairs of information. Chunks are retrieved from declarative memory by an activation process, and chunks are each associated with an activation strength which in turn is used to compute an activation probability. Chunks will typically correspond to a malware family. In the version of ACTR-IB where the families are not leveraged, the chunks correspond with samples in the training data. For a given chunk i, the activation strength $A_i$ is computed as, $$A_i = B_i + S_i + P_i \qquad (1)$$

where, $B_i$ is the base-level activation, $S_i$ is the spreading activation, and $P_i$ is the partial matching score. We describe each of these in more detail as follows.

Base-Level Activation ($B_i$): The base-level activation for chuck i reflects both the frequency and the recentness of samples in memory even though recentness is not used, although recentness could be applicable to weigh samples toward the recent ones. More important, base-level is set to the log of the prior probability (i.e., the fraction of samples associated with the chunk) in ACTR-R; for instance-based (ACTR-IB), a base level constant $\beta_i$ is set.

Spreading Activation ($S_i$): The spreading activation for chunk i is based on the strength of association between chunk i and the current test malware sample being considered. The strength of association is computed differently in both approaches and, in some cognitive model implementations, is weighted.

Partial Matching ($P_1$): A partial matching mechanism computes the similarity between two samples. In this work, it is only relevant to the instance-based approach. Given a test sample j, its similarity with a sample i in memory is computed as a product of the mismatch penalty (mp, a parameter of the system) and the degree of mismatch $M_{ji}$. We define the value of $M_{ji}$ to be between 0 and −1; 0 indicates complete match while −1 complete mismatch.

As common with models based on the ACT-R framework, chunks are discarded whose activation strength is below a certain threshold (denoted $\tau$). Once the activation strength, $A_i$, is computed for a given chunk, we can then calculate the activation probability, $p_i$. This is the probability that the cognitive model will recall that chunk and is computed using the Boltzmann (softmax) equation, which we provide below.

$$p_i = \frac{\left(e^{\frac{A_i}{s}}\right)}{\sum_j \left(e^{\frac{A_j}{s}}\right)} \quad (2)$$

Here, e is the base of the natural logarithm and s is momentary noise inducing stochasticity by simulating background neural activation (this is also a parameter of the system).

ACT-R Instance-Based Model

The instance based model is an iterative learning method that reflects the cognitive process of accumulating experiences (in this case the knowledge base of training samples) and using them to predict the tasks for unseen test samples. Each malware instance is associated with a set of attributes of that malware with its family. When a new malware sample is encountered, the activation strength of that sample with each sample in memory is computed using Equation 1. The spreading activation is a measure of the uniqueness of the attributes between a test sample i and a sample j in memory. To compute the spreading activation we compute the fan for each attribute a (fan(a) finds all instances in memory with the attribute a) of the test sample i. The Partial matching is computed as explained above. The degree of mismatch is computed as the intersection between the attribute vector of the given malware and each sample in memory normalized using the Euclidean distance between the two vectors. The retrieval probability of each sample j in memory with respect to the test sample i is then computed using Equation 2. This generates a probability distribution over families. The tasks are then determined by summing up the probability of the families associated with that task with an appropriately set threshold (we set that threshold at 0.5, based on rationality). Algorithm 1 shows the pseudo code for the instance-based model.

Time Complexity of Instance-Based Model: The Instance based model has no explicit training phase, so there is no training costs associated with it. For a given test sample the model computes the activation function for each sample in the knowledge base. Hence the time complexity increases linearly with the knowledge base. Let n be the number of the samples in the knowledge base and m is the number of attributes associated with the test sample, then the time complexity can be given as O(nm) for each test sample, as m is expected to be relative small (n>>m), the relationship is linear in n.

Act-R Rule-Based Model

In this version of ACT-R model samples are classified based on simple rules computed during the training phase. Given a malware training sample with its set of attributes a, along with the ground truth value family, a pair of conditional probabilities p(a|f) and p(a|f) are computed for an attribute in a piece of malware belonging (or not belonging) to family f. These probabilistic rules (conditional probabilities) are used to set the strength of association of the attribute with a family ($s_{a,f}$). We use empirically determined Bayesian priors p(f) to set the base-level of each family as opposed to using a constant base-level for instance based. Only two components of the activation Equation 3 are used, namely base-level and spreading activation. Given the attributes for current malware, the probability of the sample belonging to each family is calculated according to Equation 1, generating a probability distribution over families. The tasks are then determined in a similar way to that of instance-based model.

---

Algorithm 1 ACT-R Instance-based Learning

---

INPUT: New malware sample i, historical malware corpus $\mathcal{M}$.
OUTPUT: Set of tasks associated with sample i.
for query malware sample i do
    for all j in $\mathcal{M}$ do
        $B_j = \beta_j$ $$P_j = mp \times \frac{|attribs(i) \cap attribs(j)|}{\sqrt{|attribs(i)| \times |attribs(j)|}}$$

for a $\in$ attribs(i) do
            if a $\in$ attribs(j) then $$s_{ij} \mathrel{+}= \log\left(\frac{|\mathcal{M}|}{fan(a)}\right)$$

else $$s_{ij} \mathrel{+}= \log\left(\frac{1}{|\mathcal{M}|}\right)$$

end if
        end for $$S_j = \sum_j \frac{s_{ij}}{|attribs(i)|}$$

Calculate $A_j$ as per Equation 1
    end for
    Calculate $p_j$ as per Equation 2

$$p_f = \sum_{j \in f \; s.t. \; A_j \geq \tau} p_j$$

$t_p = \{t \in T | p_f \geq 0.5\}$
end for

---

Algorithm 2 ACT-R Rule-based Learning

---

INPUT: New malware sample i, historical malware corpus $\mathcal{M}$.
OUPUT: Set of tasks associated with new sample i.
TRAINING:

Let $X = \bigcup_{j \in \mathcal{M}} attrib(j)$ for all a in X do
    Compute the set of rules p(a|f) and p(a|¬f)

$$\begin{cases} \text{where } p(a|f) = \dfrac{|\{i \in \mathcal{M} \cap f \,|\, a \in attrib(i)\}|}{|f|} \text{ and} \\ p(a|\neg f) = \dfrac{|\{i \in \mathcal{M} - f \,|\, a \in attrib(i)\}|}{|\mathcal{M}| - |f|} \end{cases}$$

end for
TESTING:
for all $f \in \mathcal{F}$ do $$B_f = p(f) \; \left(\text{where } p(f) = \frac{|f|}{|\mathcal{M}|}\right)$$

for all a $\in$ attrib(i) do $$s_{a,f} = \log\left(\frac{p(a|f)}{p(a|\neg f)}\right); \; S_f \mathrel{+}= \frac{w \times s_{a,f}}{|attribs(i)|}$$

-continued

Algorithm 2 ACT-R Rule-based Learning end for
$\quad A_f = B_f + S_f$
end for
Calculate $p_f$ as per Equation 2
$t_p = \{t \in T | p_f \geq 0.5\}$ Time Complexity of Rule-based Model: For Rule-based model computing the rules for each attribute in the knowledge base significantly adds to the computation time. Let n be the number of samples in the training set, m be the number of attributes in the new piece of malware, and m* be the cardinality of $U_{j \in M}$ attrib(j). The resulting time complexity for training is then O(m*n) for training, which is significant as we observed m*>>m in our study. While this is expensive, it is noted that for testing an individual malware sample, the time complexity is less than the testing phase for the instance based O(|F|m)—though the instance based model requires no explicit training phase (which dominates the time complexity of the training phase for the rule-based approach).

Model Parameter Settings

The two proposed models leverage separate components of the activation function. Table 3 provides a list of parameters used for both the ACT-R models-standard ACT-R parameters are used that have been estimated from a wide range of previous ACT-R modeling studies from other domains which are suggested in the ACT-R reference manual.

The intuition behind these parameters is as follows. The parameter s injects stochastic noise in the model. It is used to compute the variance of the noise distribution and to compute the retrieval probability of each sample in memory. The mismatch penalty parameter mp is an architectural parameter that is constant across samples, but it multiplies the similarity between the test sample and the samples in knowledge base. Thus, with a large value it penalizes the mismatch samples more. It typically trades off against the value of the noise s in a signal-to-noise ratio manner: larger values of mp lead to more consistent retrieval of the closest matching sample whereas larger values of s leads to more common retrieval of poorer matching samples. The activation threshold τ determines which samples will be retrieved from memory to make task prediction decisions. The base level constant β is used to avoid retrieval failures which might be caused due to high activation threshold. The amount of activation w is assigned to each retrieval to avoid retrieval failures for rule-based models.

TABLE 3

Parameters for the Cognitive models.

| Model | Parameters |
|---|---|
| Instance Based Learning | β = 20 (base-level constant) |
| | s = 0.1 (stochastic noise parameter) |
| | τ = −10 (activation threshold) |
| | mp = 20 (mismatch penalty) |
| Rule Based learning | s = 0.1 (stochastic noise parameter) |
| | w = 16 (source activation) |

Experimental Setup
Baseline Approaches

The proposed cognitive models are compared against a variety of baseline approaches—one commercial package and five standard machine learning techniques. For the machine learning techniques, a probability distribution may be generated over families and return the set of tasks associated with a probability of 0.5 or greater while the commercial software was used as intended by the manufacturer. Parameters for all baseline approaches were set in a manner to provide the best performance.

Commercial Offering: Invencia Cynomix. Cynomix is a malware analysis tool made available to researchers by Invencia industries originally developed under DARPA's Cyber Genome project. It represents the current state-of-the-art in the field of malware capability detection. Cynomix conducts static analysis of the malware sample and uses a proprietary algorithm to compare it to crowd-sourced identified malware components where the functionality is known.

Decision Tree (DT). Decision tree is a hierarchical recursive partitioning algorithm. The decision tree is built by finding the best split attribute i.e. the attribute that maximizes the information gain at each split of a node. In order to avoid over-fitting, the terminating criteria is set to less than 5% of total samples. Malware samples are tested by the presence and absence of the best split attribute at each level in the tree till it reaches the leaf node. When it reaches the leaf node the probability distribution at the leaf node is assigned to the malware sample.

Naive Bayes Classifier (NB). Naive Bayes is a probabilistic classifier which uses Bayes theorem with independent attribute assumption. During training the conditional probabilities of a given attribute belonging to a particular family are computed. The prior probabilities for each family i.e. fraction of the training data belonging to each family are also computed. Naive Bayes assumes that the attributes are statistically independent hence the likelihood for a sample S represented with a set of attributes associated with a family f is given as, $$p(f|S) = P(f) \times \Pi_{i=1}^{d} p(a_i|f).$$

Random Forest (RF). Ensemble methods are popular classification tools. It is based on the idea of generating multiple predictors used in combination to classify new unseen samples. A random forest is used which combines bagging for each tree with random feature selection at each node to split the data thus generating multiple decision tree classifiers. Each decision tree gives its own opinion on test sample classification, which is then merged to generate a probability distribution over families. For all the experiments we set the number of trees to be 100, which gives us the best performance.

Support Vector Machine (SVM). Support vector machines (SVM) work by finding a separating margin that maximizes the geometric distance between classes. The separating margin is termed as hyperplane. The popular LibSVM implementation is used, which is publicly available. The implementation has the option of returning the probability distribution as opposed to the maximum probability prediction.

Logistic Regression (LOG-REG). Logistic regression classifies samples by computing the odds ratio. The odds ratio gives the strength of association between the attributes and the family like simple rules used in the ACT-R rule based learning. The multinomial logistic regression is implemented which handles multi-class classification.

Dynamic Malware Analysis

Dynamic analysis studies a malicious program as it executes on the host machine. It uses tools like debuggers, function call tracers, machine emulators, logic analyzers, and network sniffers to capture the behavior of the program. Two publicly available malware analysis tools generate attributes for each malware sample. These tools make use of sandbox which is a controlled environment to run malicious software.

Anubis Sandbox. Anubis is an online sandbox which generates an XML formatted report for a malware execution in a remote environment. It generates detailed static analysis of the malware, but provides lesser details regarding the behavior of the malware on the host machine. Since it is hosted remotely the settings cannot be modified.

Cuckoo Sandbox. Cuckoo is a standalone sandbox implemented using a dedicated virtual machine and more importantly can be customized to suit our needs. Cuckoo generates detailed reports for both static as well as behavior analysis by watching and logging the malware while Cuckoo is running on the virtual machine. This behavior analysis proves to be unique indicators for a given malware for the experiments.

Performance Evaluation

In tests, performance was evaluated based primarily on three metrics: precision, recall, and unbiased F1. For a given malware sample being tested, precision is the fraction of tasks the algorithm associated with the malware that were actual tasks in the ground truth. Recall, for a piece of malware, is the fraction of ground truth tasks identified by the algorithm. The unbiased F1 is the harmonic mean of precision and recall. In the results, the averages for precision, recall, and unbiased F1 for the number of trials performed were reported.

Results

All experiments were run on Intel core-i7 operating at 3.2 GHz with 16 GB RAM. Only one core was used for experiments. All experimental results presented in this section are new and have not been previously introduced.

Mandiant Dataset

The first set of experiments uses a dataset based on the T1 cyber espionage group as identified in the popular report by Mandiant Inc. This dataset consisted of 132 real malware samples associated with the Mandiant report that were obtained from the Contagio security professional website. Each malware sample belonged to one of 15 families including BISCUIT, NEWSREELS, GREENCAT and COOKIEBAG. Based on the malware family description, a set of tasks were associated with each malware family (that each malware in that family was designed to perform). In total, 30 malware tasks were identified for the given malware samples (see Table 2). On average, each family performed 9 tasks.

The four machine learning approaches were compared with the rule based and instance-based ACT-R models (ACTR-R and ACTR-IB respectively). The samples were processed by a Cynomix tool for automatic detection of capabilities. These detected capabilities were then manually mapped to the tasks from the Mandiant report. Precision and recall values were computed for the inferred adversarial tasks. On average the machine learning approaches predicted 9 tasks per sample, ACTR-R predicted 9 tasks per sample and ACTR-IB predicted 10 tasks. On the other hand Cynomix was able to detect on average only 4 tasks.

Leave One Out Cross-Validation (LOOCV)

In leave one out cross validation, for n malware samples, we train on n−1 samples and test on the remaining one. This procedure was repeated for all samples and the results were averaged. This experiment was performed using both sandboxes and compared the results (see Table 4).

TABLE 4

Performance comparison of Anubis and Cuckoo Sandbox

| Method | Anubis (F1) | Cuckoo (F1) |
| --- | --- | --- |
| DT | 0.80 | 0.80 |
| NB | 0.71 | 0.74 |
| LOG-REG | 0.82 | 0.85 |
| SVM | 0.86 | 0.90 |
| RF | 0.89 | 0.89 |
| ACTR-R | 0.85 | 0.88 |
| ACTR-IB | 0.93 | 0.96 |

The average F1 increases by 0.03 when the attributes generated are used by the Cuckoo sandbox instead of Anubis. The statistical significance results are as follows: for ACTR-IB ($t(132)=1.94$, $p=0.05$), ACTR-R ($t(132)=1.39$, $p=0.16$), RF ($t(132)=0.56$, $p=0.57$), SVM ($t(132)=1.95$, $p=0.05$), LOG-REG ($t(132)=1.82$, $p=0.07$), NB ($t(132)=1.79$, $p=0.08$) and DT ($t(132)=0.83$, $p=0.4$). Since having behavior analysis generates attributes which aid in the decision making for task prediction, the cuckoo sandbox was used for rest of the experiments.

FIG. 1 compares the performance of the five best performing methods from Table 1 and compares it with the Cynomix tool of Invincea industries. ACTR-IB outperformed LOG-REG, SVM, RF and ACTR-R; average F1=0.97 vs 0.85 ($t(132)=7.85$, $p<0.001$), 0.9 ($t(132)=4.7$, $p<0.001$), 0.89 ($t(132)=5.45$, $p<0.001$) and 0.88 ($t(132)=5.2$, $p<0.001$) respectively. Both the proposed cognitive models and machine learning techniques significantly outperformed the Cynomix tool in detecting the capabilities (tasks).

Figure 2:
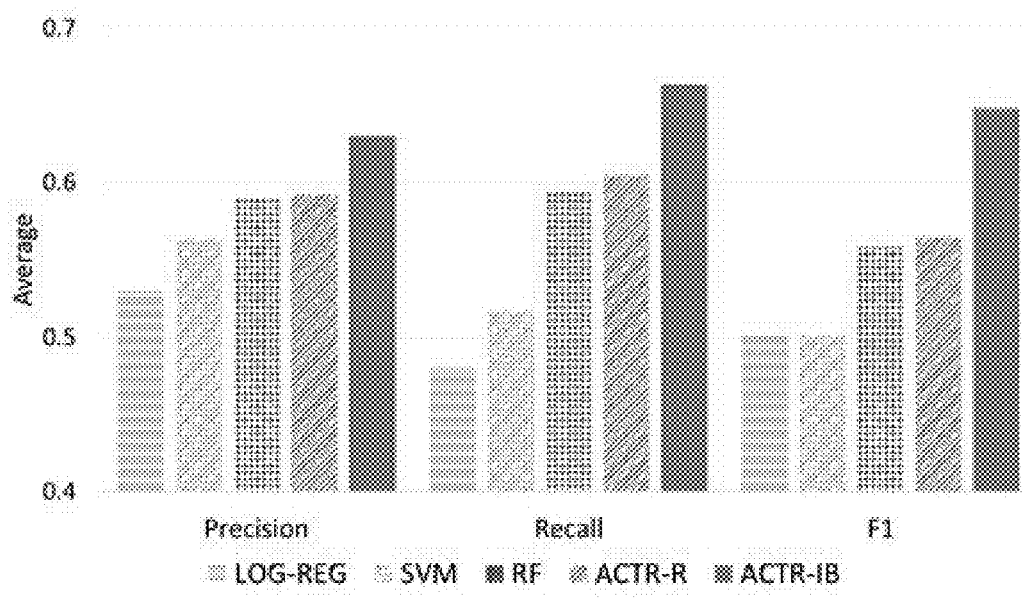
FIG. 2 is a graph illustrating Average Precision, Recall, and F1 comparisons for LOG-REG, RF, SVM, ACTR-R, and ACTR-IB for leave one family out cross validation.
Figure 3A:
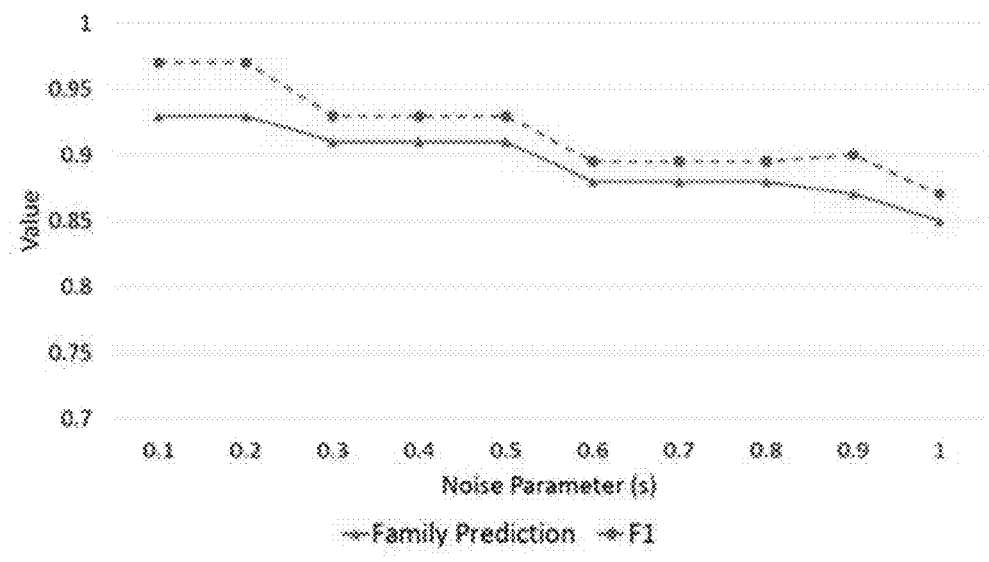
FIGS. 3A-3F are graphs illustrating the variation of family prediction accuracy and F1 score with respect to different noise parameter values and for different activation thresholds.
Figure 3B:
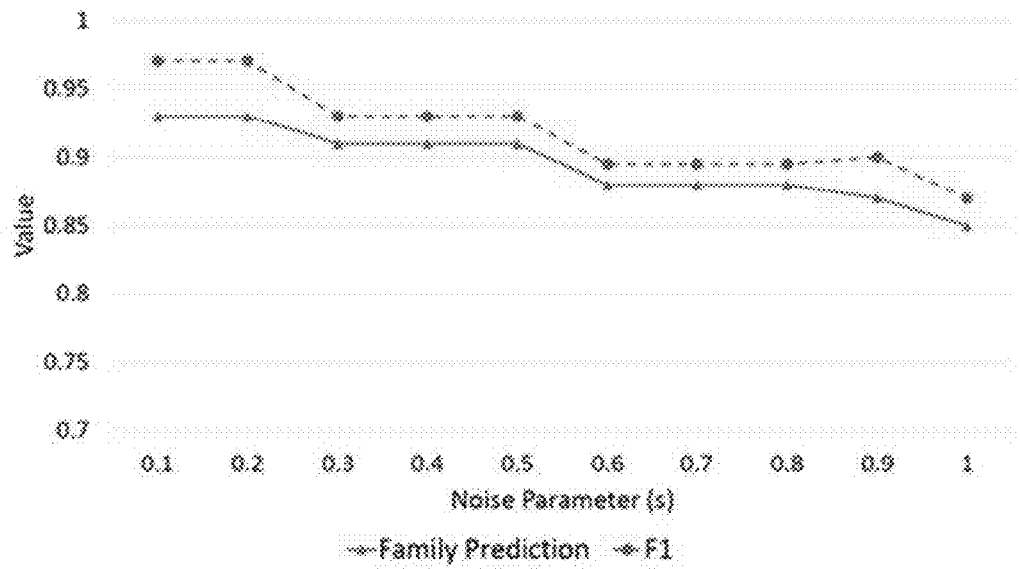
Figure 3C:
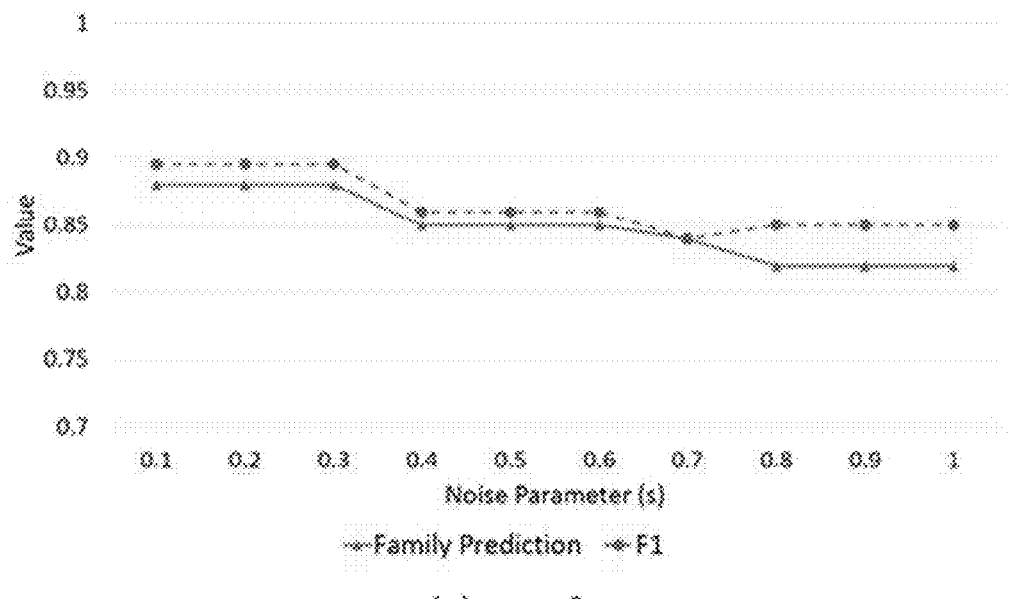
Figure 3D:
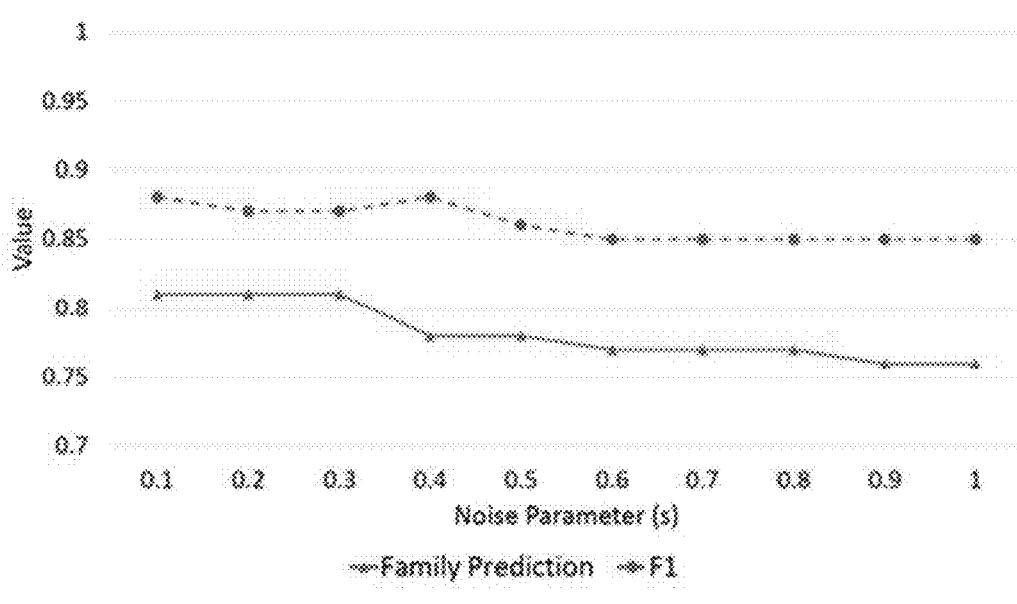
Figure 3E:
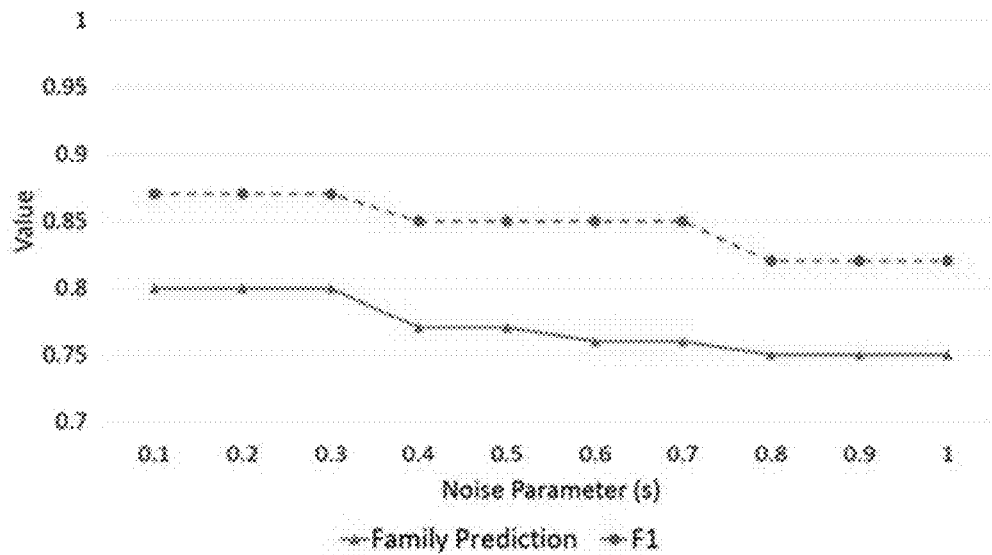
Figure 3F:
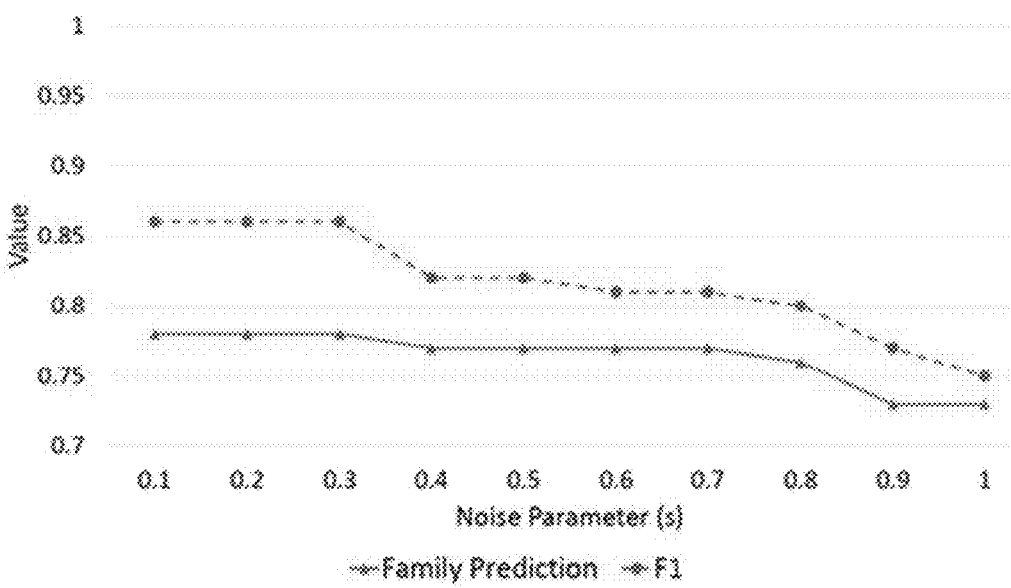

Leave-One-Family-Out Cross Validation:

To see how the models generalize to unseen malware family, a leave-one-family-out comparison was performed, where the models were tested against one previously unseen malware family. ACTR-IB significantly outperforms other approaches in terms of precision, recall and F1 as shown in FIG. 2.

Parameter Exploration:

Two system parameters will now be discussed that control the performance of the ACT-R instance based model namely the stochastic noise parameter (s) and the activation threshold ($\tau$). The Mandiant dataset is used to perform this evaluation. The parameter s takes values between 0.1 and 1 (typical values range from 0.1 to 0.3). The value of the activation threshold depends on the application. FIG. 3 shows the variation of family prediction accuracy and F1 score with respect to different noise parameter values and for different activation thresholds. The parameter s is used to compute the variance of the noise distribution and retrieval probability of sample in memory. Larger value of s triggers the retrieval of poor matching samples, which leads to lower family prediction and F1 scores.

As seen in the FIGS. 3A-3F, as the value of s increases the performance decreases. On the other hand, the activation threshold dictates how many closely matched samples will be retrieved from memory. For high values of $\tau$ the performance decreases as many fewer samples are retrieved. For lower values of $\tau$ we end up retrieving almost all the samples in the training data, hence the performance does not decrease as $\tau$ decreases, but it adds to the computational cost of retrieving high number of samples which is not desirable. We get the best performance for $\tau=-10$ and $s=0.1$. Even $s=0.2$ is almost as good as 0.1 providing some advantages in terms of stochasticity ensuring robustness.

The base-level constant (β) and mismatch penalty (mp) values is kept constant. As explained earlier the base-level constant trades off directly against the retrieval threshold, and the mismatch penalty against the activation noise, respectively, so it makes sense to vary only one of the pair.

GVDG Dataset

Figure 4:
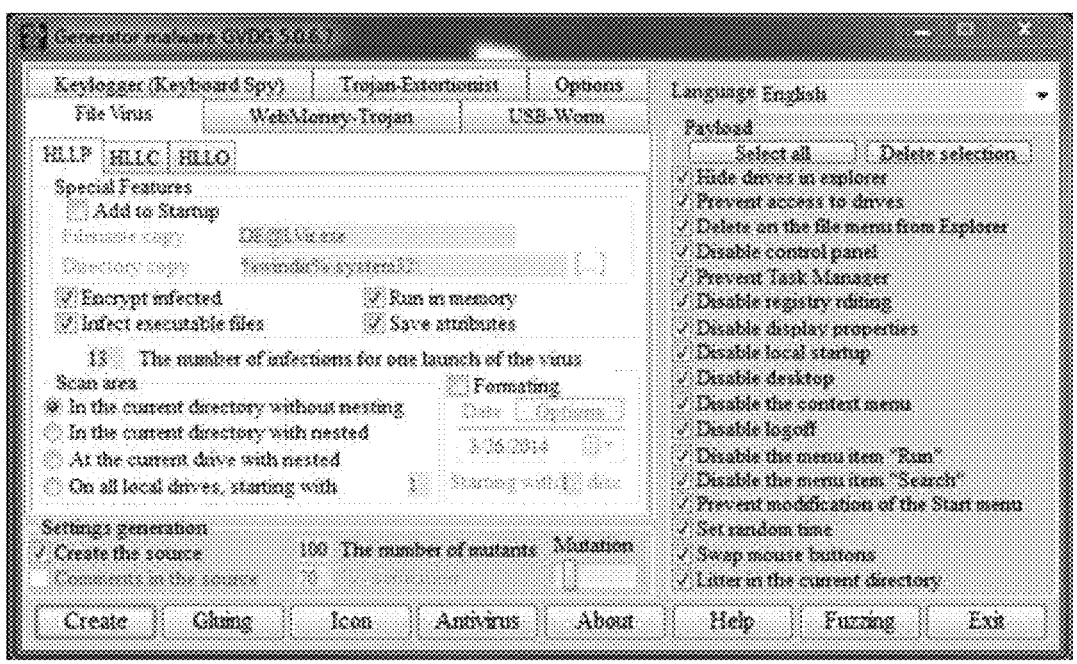
FIG. 4 is snapshot of a GVDG user interface used for the generation of malware samples.

GVDG is a malware generation tool designed for the study of computer threats. It is capable of generating following malware threats, File-virus
Key=Logger
Trojan-Extortionist
USB-Worm
Web Money-Trojan FIG. 4 shows the GVDG user interface used for the generation of malware samples. The carrier type and the tasks are selected that are wanted for the malware sample to perform on the host machine. The tasks are represented as payloads, while carrier is a functional template of specific behavior, which are the operational framework supporting and enabling the task activity. In generating datasets with GVDG, families are specified based on sets of malware with the same tasks. Whether or not a family consists of malware with the same carrier depends on the experiment. Further, GVDG also has an option to increase "mutation" or variance among the samples. Experiments were performed analyzing the performance of the methods of the present invention when the generated samples belong to different carrier and same carrier types, as well as when the samples are encrypted and mutated making task prediction difficult. In all the experiments 60% of the data for training and 40% for testing are considered. The results are averaged across 10 trials. The Cynomix tool from Invencia was unable to detect any tasks for the GVDG dataset, primarily due to its inability to find public source documents referencing GVDG samples and also unable to generalize from similar samples.

Figure 5:
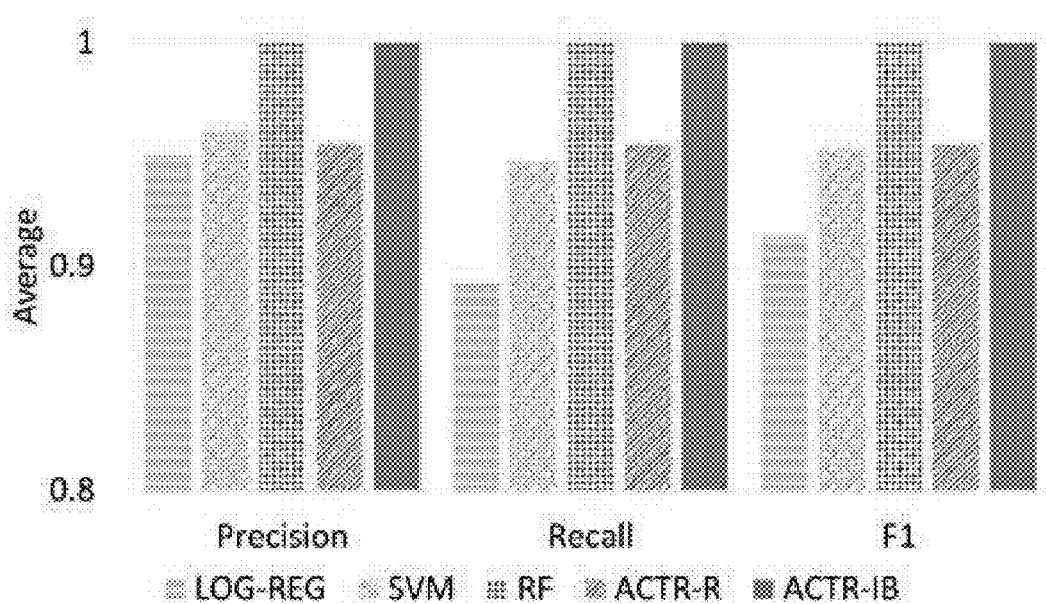
FIG. 5 is a graph illustrating Average Precision, Recall, and F1 comparisons for LOG-REG, SVM, RF, ACTR-R and ACTR-IB for different carrier samples.
Figure 6:
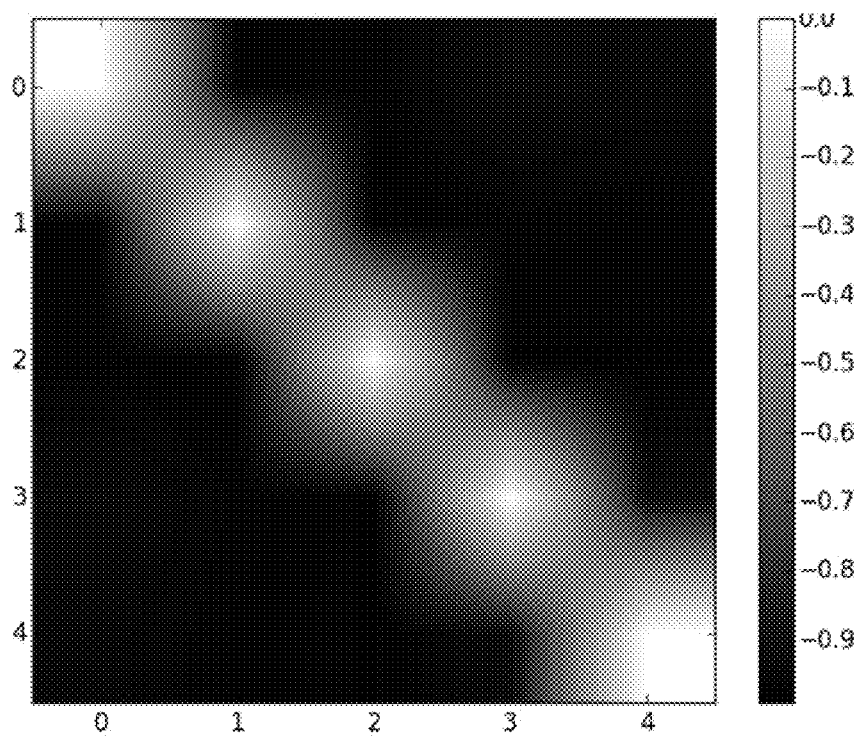
FIG. 6 is a graph illustrating a similarity matrix for 5 different carriers.
Figure 7:
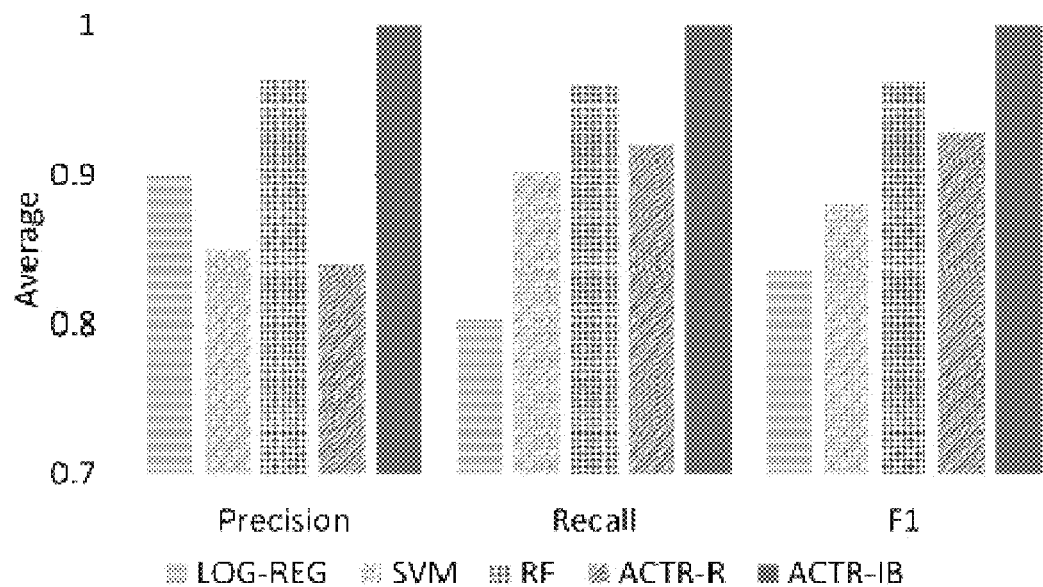
FIG. 7 is a graph illustrating Average Precision, Recall, and F1 for LOG-REG, SVM, RF, ACTR-R and ACTR-IB for different carrier mutated samples.

Different Carriers:

In this experiment, 1000 samples were generated for each carrier type with low mutation. On average each carrier type performs 7 tasks (payloads). Hence each carrier represents one family for this experiment. Both random forest and ACTR-IB model were able to predict the tasks and family with F1 measure of 1.0 outperforming LOG-REG 1 vs 0.91, SVM 1 vs 0.95 and ACTR-R 1 vs 0.95. All results are statistical significant with (t (1998)>8.93, p<0.001) (FIG. 5). These results are not surprising given that different carrier (family) types have high dissimilarity between them. Also, samples belonging to the same carrier have on average 60% of similar attributes. FIG. 6 shows the similarity between the carrier types. The similarity between families is calculated in the same way as ACTR-IB partial matching with 0 indicating complete match while −1 complete mismatch.

Figure 8:
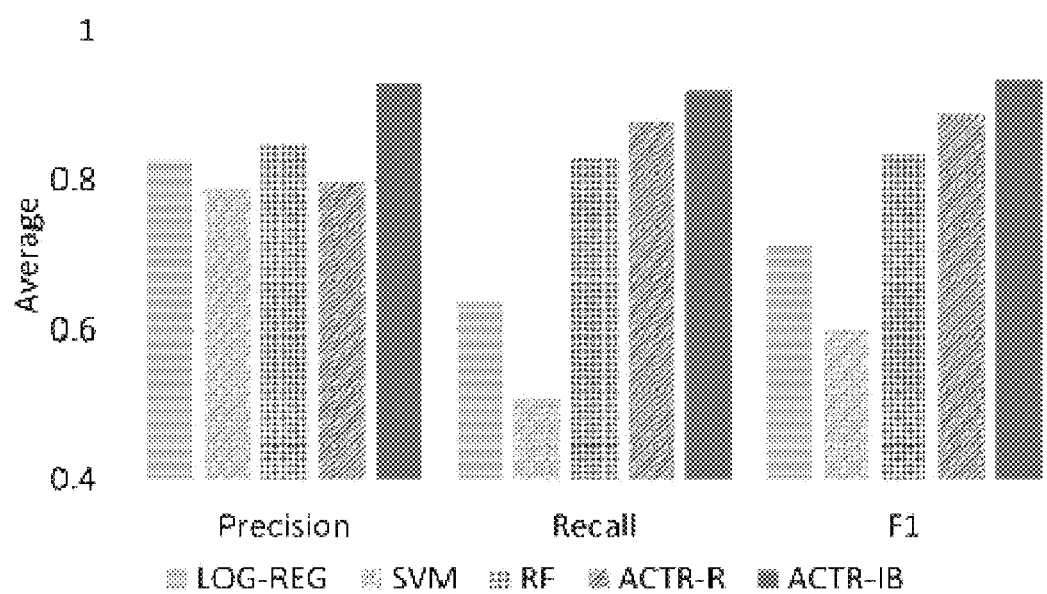
FIG. 8 is a graph illustrating Average Precision, Recall, and F1 comparisons for LOG-REG, SVM, RF, ACTR-R and ACTR-IB for less training data.

Different Carriers-Mutation:

For this case, the same samples are generated as in the previous experiment but with maximum mutation between samples belonging to the same carrier. 1000 samples were generated for each carrier with maximum mutation. In this case ACTR-IB had an average F1 of 1 outperforming LOG-REG 1 vs. 0.83 (t (2000)=22.98, p=0.0), SVM 1 vs 0.88, RF 1 vs 0.96 and ACTR-R 1 vs 0.92 (t (1998) 7, p<0.001) (FIG. 8).

High mutation induces high variance between samples associated with the same carrier making the classification task difficult. High mutation samples belonging to same carrier have only 20% of common attributes as compared to 60% for low mutation.

Less Training Data:

In order to see how the cognitive models perform with less training data, the different-carrier mutation experiment were repeated with 10% of the training data (300 samples). Even with less training data ACTR-IB had an average F1 of 0.93 outperforming LOG-REG 0.93 vs 0.71, SVM 0.93 vs 0.6, RF 0.93 vs 0.83 and ACTR-R 0.93 vs 0.88 (t (1998) >2.89, p<0.001) (FIG. 8).

Figure 9:
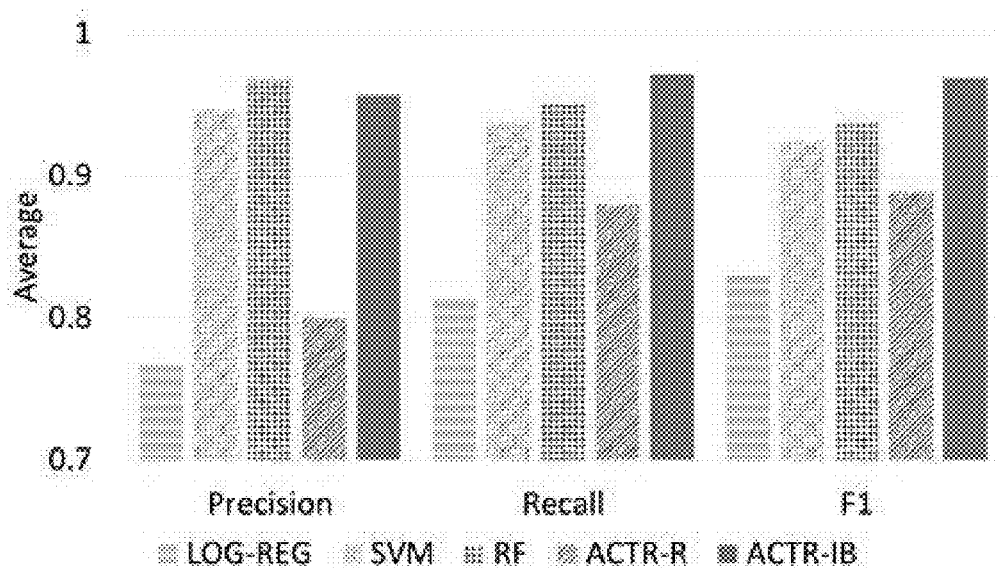
FIG. 9 are a pair of graphs illustrating Average Precision, Recall, and F1 comparisons for LOG-REG, SVM, RF, ACTR-R and ACTR-IB for low-high mutated samples.
Figure 11:
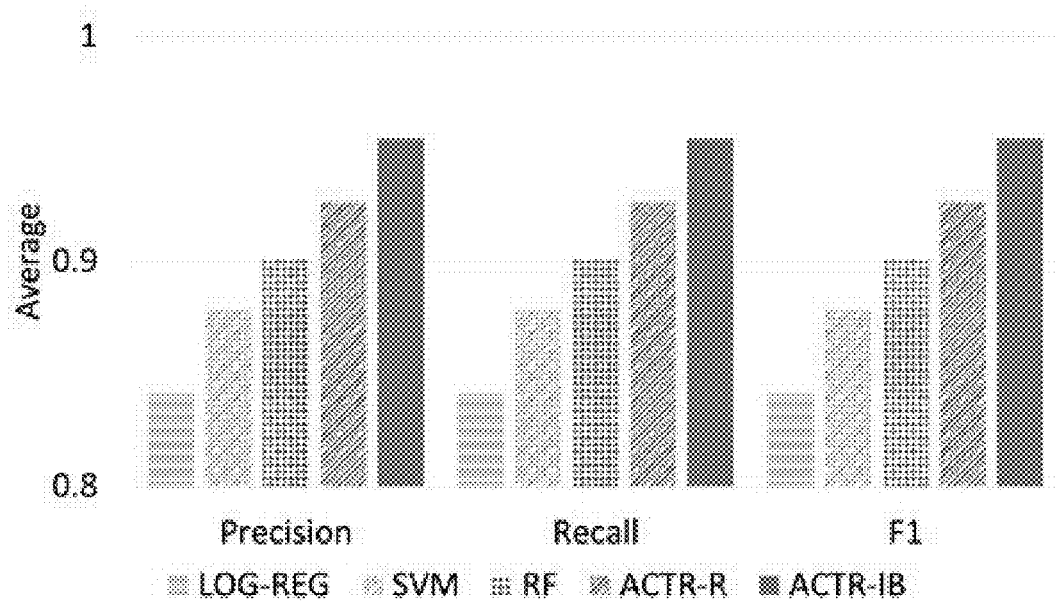
FIG. 11 is a graph illustrating Average Precision, Recall, and F1 comparisons for LOG-REG, SVM, RF, ACTR-R and ACTR-IB for unencrypted same carrier samples.

Different Carriers: Low-High Mutation:

For this case, the low mutation samples were considered as training data and the high mutation samples as testing. FIG. 11 shows the comparison results. ACTR-IB had an average F1 of 0.96 outperforming LOG-REG 0.96 vs 0.83, SVM 0.96 vs 0.92, RF 0.96 vs 0.93 and ACTR-R 0.96 vs 0.88 (t (2498)>15.7, p≤0.001) (FIG. 9).

Figure 10:
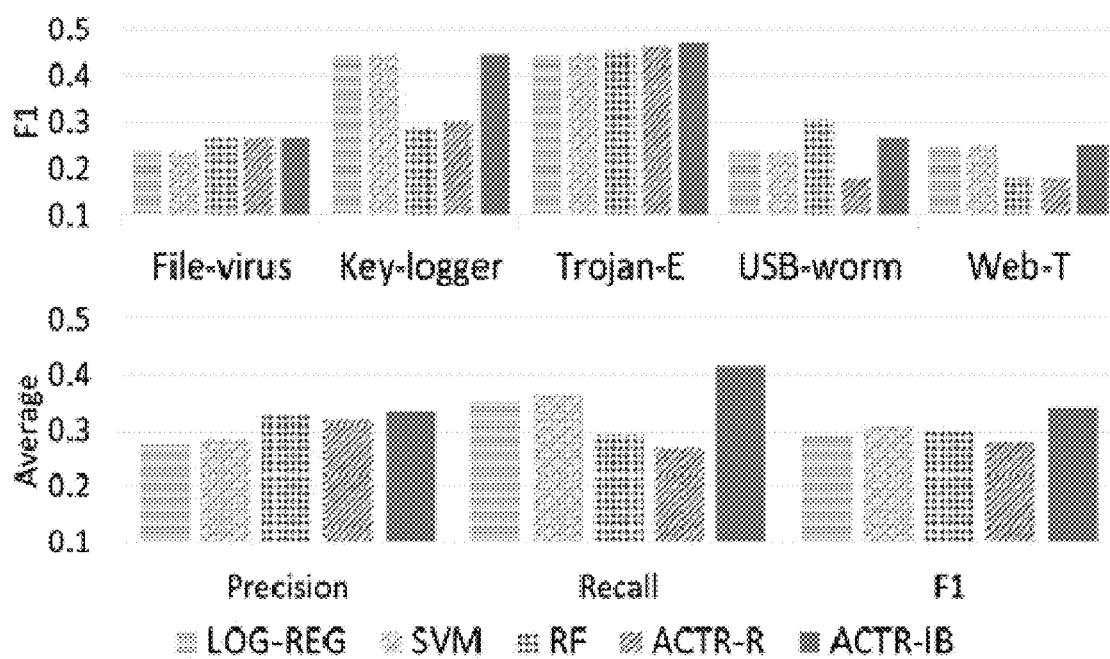
FIG. 10 are a pair of graphs showing Average F1 values for 5 carriers and the average precision, recall and F1 across all carriers for LOG-REG, SVM, RF, ACTR-R and ACTR-IB for Leave-one-carrier-out.

Leave One Carrier Out Cross-Validation:

To see how the models generalize to unseen malware family (carrier), a leave-one-carrier-out comparison was performed, where the models were tested against one previously unseen malware carrier. ACTR-IB performs better or on par with all other baseline approaches for all the carriers. It clearly outperforms all the approaches in recalling most of the actual tasks (40%) (See FIG. 10). ACTR-IB has shown to generalize for unseen malware families. This case is difficult given the fact that the test family is not represented during training, and hence task prediction depends on associating the test family with the training families that perform similar tasks.

Figure 12:
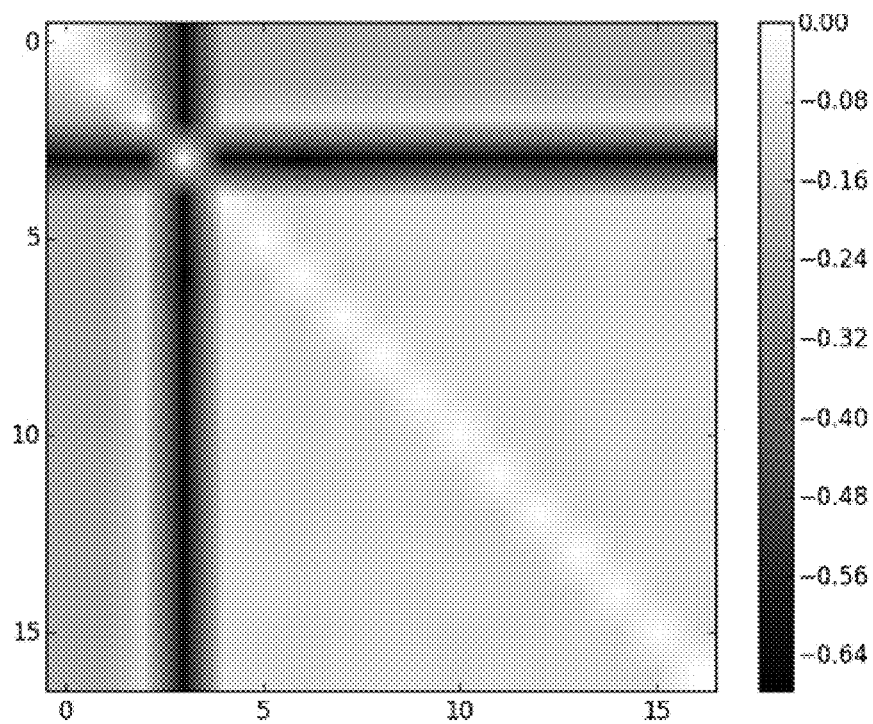
FIG. 12 is a graph showing a similarity matrix for 17 versions of the same carrier.

Same Carrier:

As seen in the previous experiments, different carrier-types make the task easier because of less similarity between each carrier-type. The performance is tested on the same carrier type performing exactly one task. Since there are 17 tasks in the GVDG tool, 100 samples are generated for each task for carrier type File-virus. In this experiment each task represents one family. Thus in total we have 1700 samples. We do the 60-40 split experiment. From FIG. 11 ACTR-IB had an average F1 of 0.95 outperforming LOG-REG 0.95 vs 0.84, SVM 0.95 vs 0.87, RF 0.95 vs 0.90 and ACTR-R 0.95 vs 0.92 (t (678)≥1.52, p≤0.13). Using the same carrier for each payload makes the task difficult as can be seen from the similarity matrix for the 17 payloads (FIG. 12).

Same Carrier-Encryption

Figure 13:
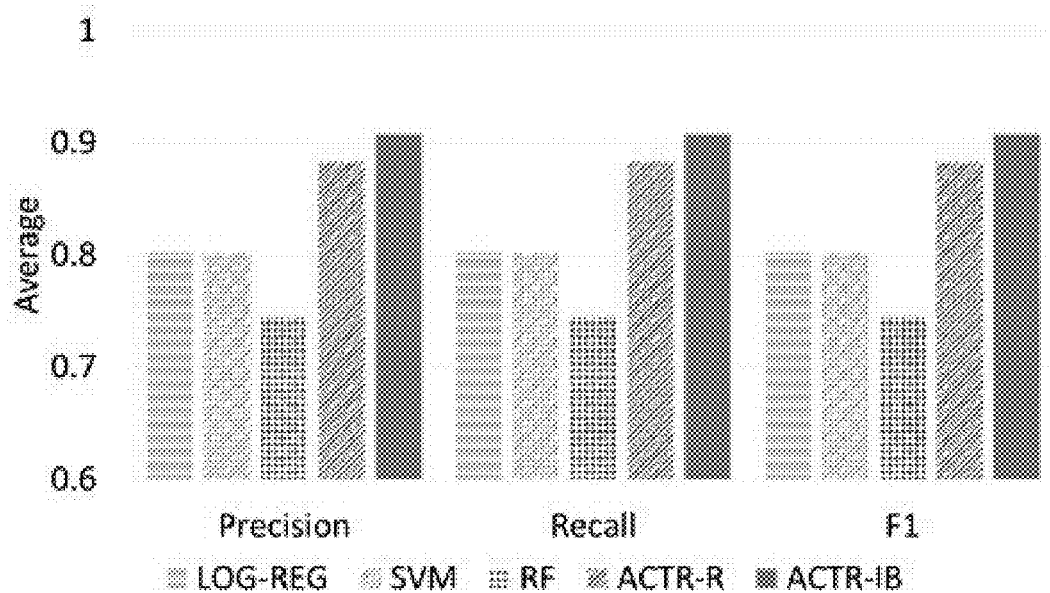
FIG. 13 is a graph illustrating Average Precision, Recall, and F1 comparisons for LOG-REG, SVM, RF, ACTR-R and ACTR-IB for encrypted same carrier samples.

GVDG tool provides the option for encrypting the malware samples for the File-virus carrier type. This option can generate 100 encrypted malware samples for each task (payload) and use them as test data with the unencrypted versions from the same carrier experiment as training samples. From FIG. 13 ACTR-IB had an average F1 of 0.9 outperforming LOG-REG 0.9 vs 0.8, SVM 0.9 vs 0.8, RF 0.9 vs 0.74 and ACTR-R 0.9 vs 0.88 (t (1698)≥2.36, p≤0.02). Encrypting malware samples morphs the task during execution making it difficult to detect during analysis. Hence the drop in performance as compared to non-encrypted samples. It is noted that SVM performs better than RF likely because it looks to maximize generalization.

Runtime Analysis

Table 5 shows the classifier run times for the experiments. Machine learning techniques are faster but have large training times, which increase almost linearly as you increase the knowledge base. Hence updating the knowledge base is computationally expensive for these methods, as it has to re-estimate the parameters every time. The same notion holds true for ACTR-R, since computing the rules during training phase is expensive as can be seen from the large training times. ACTR-IB on the other hand has no explicit training phase, so the only time cost is during testing. In fact ACTR-IB is faster than SVM and RF for same/encrypted carrier experiments.

Scaling of Instance-Based Model

Finally to conclude the GVDG experiments, ACTR-IB is run on a combination of all the above variations of dataset to highlight the space requirements for the learning model. The dataset comprises of 5 different carriers with low/high mutation (10,000 samples) and same carrier encrypted/non-encrypted (3400 samples). Based on the tasks they perform there are in total 22 families represented by 13,400 samples. The analysis reports generated by cuckoo take up 4 gigabytes of disk space for the samples. The size is significantly reduced to 600 megabytes by parsing the analysis reports and extracting attributes. 10% of the samples are set aside for testing (1340) and iteratively add 10% of the remaining data for training. Table 6 gives a summary of the average F1 measure and testing time for ACTR-IB. The results are averaged across 10 trials. There is a steady increase in performance till we reach 40% of the training data, after that the F1 measure remains almost constant. This experiment clearly indicates the ability of the ACTR-IB to learn from small amount of representation from each family, significantly reducing the size of the knowledge base required for training. In addition, the inventors are also looking into techniques to reduce the time requirements of instance-based learning algorithm (e.g., Andrew Moore explored efficient tree-based storage). There are also known techniques for reducing space requirements, in which training instances were merged in the ACT-R-Gammon model and obtained considerable space savings at little performance cost.

TABLE 5

Classifier run times

| Experiment | Model | Train (sec) | Test (sec) |
|---|---|---|---|
| Different carriers | LOG-REG | 202 | 7 |
| | SVM | 250 | 50 |
| | RF | 280 | 30 |
| | ACTR-R | 6443 | 143 |
| | ACTR-IB | — | 453 |
| mutated carriers | LOG-REG | 214 | 18 |
| | SVM | 260 | 63 |
| | RF | 303 | 85 |
| | ACTR-R | 7223 | 185 |
| | ACTR-IB | — | 465 |
| same carriers | LOG-REG | 152 | 4.22 |
| | SVM | 270 | 38 |
| | RF | 290 | 55 |
| | ACTR-R | 4339 | 120 |
| | ACTR-IB | — | 205 |
| encrypted carriers | LOG-REG | 180 | 15 |
| | SVM | 300 | 80 |
| | RF | 353 | 110 |
| | ACTR-R | 6103 | 180 |
| | ACTR-IB | — | 365 |

TABLE 6

Summary of ACTR-IB results.

| Fraction of training data | F1 measure | Test time (sec) |
|---|---|---|
| 0.1 | 0.77 | 418 |
| 0.2 | 0.82 | 839 |
| 0.3 | 0.90 | 1252 |
| 0.4 | 0.97 | 1676 |
| 0.5 | 0.97 | 2100 |

TABLE 6-continued

Summary of ACTR-IB results.

| Fraction of training data | F1 measure | Test time (sec) |
|---|---|---|
| 0.6 | 0.97 | 2525 |
| 0.7 | 0.97 | 2956 |
| 0.8 | 0.98 | 3368 |
| 0.9 | 0.98 | 3787 |
| 1.0 | 0.98 | 4213 |

MetaSploit

MetaSploit is a popular penetration testing tool used by security professionals to identify flaws in the security systems by creating attack vectors to exploit those flaws. Penetration testing may also be defined as the methods an attacker would employ to gain access to security systems. Hence identifying the tasks the exploit was designed to perform is important to counter the exploit.

Figure 14:
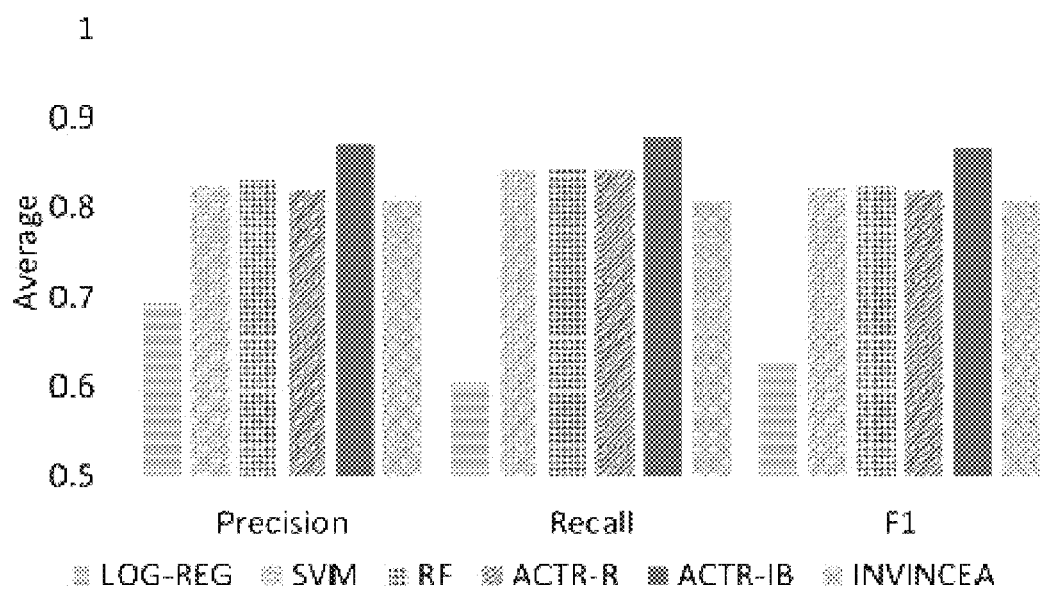
FIG. 14 is a graph illustrating Average Precision, Recall, and F1 comparisons for LOG-REG, SVM, RF, ACTR-R and ACTR-IB for MetaSploit.

For this experiment exploits are generated that attacks windows operating systems. Each exploit has a set of tasks associated with it. The tasks include setting up tcp & udp backdoor connections, adding unauthorized users to the system, modifying root privileges, download executables and execute them on the local machine etc. 4 exploit families are generated with 100 samples each performing on average 4 tasks. A mutation is induced between samples belonging to the same family making the classification task difficult. A 60-40 split training-testing experiment is performed and average the results across 10 trials. From FIG. 14 ACTR-IB had an average F1 of 0.86 outperforming LOG-REG 0.86 vs 0.62, SVM 0.86 vs 0.82, RF 0.86 vs 0.82, ACTR-R 0.86 vs 0.81 and INVINCEA 0.86 vs 0.8 (t (158)≥1.94, p≤0.05.

Task Prediction from Hacker Activities

In all the experiments discussed so far, the tasks associated with a given piece of malware are predefined and do not change with time. In this section, the tasks are mapped that a hacker is trying to achieve from the activities it performs on a compromised system. For the entire experiment only one malware is used whose sole purpose is to create a tcp backdoor connection to let the hacker have access to the system. The test samples were evaluated only using ACTR-IB and no other machine learning methods. The goal of this experiment is to demonstrate how the system can deal with real time hacker activities on a compromised system. It demonstrates the capability of the proposed system to capture hacker behavior.

The experimental setup is as follows. The Cuckoo sandbox is kept running on the system by executing the malware. This will create a connection between the hacker and the system. Once the hacker gains control of the machine, he can perform operations in order to achieve his objectives. These objectives are treated as the tasks that the hacker wants to complete on the system. Once these tasks are completed, Cuckoo generates an analysis report detailing the behavioral analysis of the hacker. However, these analytics are too detailed for instance file and registry execution commands and do not provide a clear picture of the main tasks of the hacker on the machine. Hence, traditionally, this will often require an expert security analyst to go through large analysis results to determine the task which is often time consuming. But instead, the analysis report is fed to the ACTR-IB model to get a prediction of the hacker tasks. For this experiment the MetaSploit dataset discussed earlier is used as the knowledge base for the instance based approach. For the test set the samples were generated in real time with hackers trying to achieve their goals (tasks) on the compromised system. Note, this test also illustrates how well the model generalizes, as the hacker behavior is being identified using historical data that was not generated by the hacker—or even a human in this case. Two hackers are considered who are given a list of the payloads (tasks) to complete from the list mentioned in the MetaSploit experiment. They always perform a fraction of the tasks assigned to them at a given time instance and then the model is tested on predicting these tasks.

Ten such attacks were generated, 5 from each hacker. Each attack consists of achieving 5 tasks on average. Wit is noted that for each of the test samples the malware used is the same. ACTR-IB results are presented in Table 7. The results are averaged for each hacker across test samples. Table 8 shows the actual and predicted tasks for Hacker-1 for 5 different attack instances. The results for Hacker-2 were analogous.

TABLE 7

Summary of ACTR-IB results.

| Subject | Average Precision | Average Recall | Average F1 |
|---|---|---|---|
| Hacker-1 | 0.8 | 0.85 | 0.83 |
| Hacker-2 | 0.85 | 0.85 | 0.85 |

TABLE 8

Actual and predicted Hacker-1 attacks.

| Attack Instance | Actual Tasks | Predicted Tasks |
|---|---|---|
| 1 | setup backdoor connection<br>modify root privileges<br>uninstall program<br>copy files | setup backdoor connection<br>modify root privileges<br>uninstall program<br>delete system files<br>prevent access to drive |
| 2 | setup backdoor connection<br>modify root privileges<br>download executables<br>execute files<br>copy files | setup backdoor connection<br>modify root privileges<br>download executables<br>execute files<br>delete files |
| 3 | setup backdoor connection<br>modify root privileges<br>add unauthorized users<br>start keylogging<br>uninstall program<br>delete files<br>prevent access to drives | setup backdoor connection<br>modify root privileges<br>add unauthorized users<br>start keylogging<br>uninstall program<br>delete files |
| 4 | setup backdoor connection<br>add unauthorized users<br>prevent writing data to disk<br>delete files<br>copy files | setup backdoor connection<br>add unauthorized users<br>prevent writing data to disk<br>delete files<br>modify root privileges<br>prevent access to drives |
| 5 | setup backdoor connection<br>download executables<br>execute files<br>start keylogging | setup backdoor connection<br>download executables<br>execute files<br>start keylogging |

Family Prediction Results:

One more measure of evaluation is computed; namely, family prediction accuracy—the fraction of trials where the most probable family was the ground truth family of the malware in question—is meant to give some insight into how the algorithm performs in the intermediate steps.

The family prediction accuracies for the set of experimental results discussed demonstrating the ability of cognitive models are compared to predict the family of the malware better than machine learning approaches.

Mandiant Dataset:
Leave Me Out Cross Validation:

In addition to F1 measure, the family prediction accuracy is also used to compare the two sandboxes namely, Anubis and Cuckoo. Table 9 shows the performance comparison.

TABLE 9

Family prediction comparison for Anubis and Cuckoo.

| Method | Anubis (Family) | Cuckoo (Family) |
|---|---|---|
| DT | 0.59 | 0.63 |
| NB | 0.30 | 0.40 |
| LOG-REG | 0.65 | 0.84 |
| SVM | 0.85 | 0.86 |
| RF | 0.82 | 0.86 |
| ACTR-R | 0.73 | 0.89 |
| ACTR-IB | 0.81 | 0.93 |

There is a significant improvement in family prediction for ACTR-IB improving by 0.12 from 0.81 to 0.93 (t (132)=3.86, p<0.001) and ACTR-R by 0.15 from 0.72 to 0.87 (t (132)=3.78, p<0.001) outperforming all other methods. Hence for all other experiments we only consider cuckoo sandbox to generate the analysis report.

For the cuckoo sandbox the three best performing machine learning approaches (LOG-REG, SVM, and RF) are considered and compared their performance against the cognitive models for predicting the correct family (before the tasks were determined). ACTR-IB outperformed LOG-REG, SVM, RF and ACTR-R; average family prediction=0.93 vs 0.84 (t (132)=3.22, p<0.001), 0.86 (t (132)=3.13, p<0.001), 0.86 (t (132)=3.13, p<0.001) and 0.89 (t (132)=2.13, p=0.03) respectively.

GVDG Dataset:

Table 10 shows the family prediction comparison done on the GVDG dataset under different conditions discussed in the experimental section. We provide significance test for the results for each of the discussed cases.

Different Carriers:

For family prediction ACTR-IB and RF outperformed LOG-REG 1 vs 0.92, SVM 1 vs 0.92 and ACTR-R 1 vs 0.95 (t (1998)≥8.93, p<0.001).

High Mutated Carriers:

For family prediction ACTR-IB outperformed LOG-REG 1 vs 0.85, SVM 1 vs 0.88, RF 1 vs 0.95 and ACTR-R 1 vs 0.92 (t (1998)≥7, p<0.001).

Less Training (Different Carriers):

For family prediction ACTR-IB outperformed LOG-REG 0.91 vs 0.73 (t (1998)=19.3, p<0.001), SVM 0.91 vs 0.58, RF 0.91 vs 0.79 and ACTR-R 0.91 vs 0.88 (t (1998)≥2.05, p≤0.04).

Low-High Mutation (Different Carriers):

For family prediction ACTR-IB outperformed LOG-REG 0.96 vs 0.81, SVM 0.96 vs 0.92, RF 0.96 vs 0.94 and ACTR-R 0.96 vs 0.88 (t (2498)≥7, p<0.001).

Same Carrier (Non-Encrypted and Encrypted):

Since each family performs exactly one task the family prediction is similar to the F1 measure.

TABLE 10

Family prediction comparison

| Experiment | Model | Family Prediction |
|---|---|---|
| Different carriers | LOG-REG | 0.92 |
| | SVM | 0.92 |
| | RF | 1.0 |

TABLE 10-continued

Family prediction comparison

| Experiment | Model | Family Prediction |
|---|---|---|
| | ACTR-R | 0.95 |
| | ACTR-IB | 1.0 |
| High mutated carriers | LOG-REG | 0.85 |
| | SVM | 0.88 |
| | RF | 0.95 |
| | ACTR-R | 0.92 |
| | ACTR-IB | 1.0 |
| Less training | LOG-REG | 0.73 |
| | SVM | 0.58 |
| | RF | 0.79 |
| | ACTR-R | 0.88 |
| | ACTR-IB | 0.91 |
| Low-high mutation | LOG-REG | 0.81 |
| | SVM | 0.92 |
| | RF | 0.94 |
| | ACTR-R | 0.88 |
| | ACTR-IB | 0.96 |
| Same carriers | LOG-REG | 0.84 |
| | SVM | 0.87 |
| | RF | 0.90 |
| | ACTR-R | 0.92 |
| | ACTR-IB | 0.95 |
| Same carrier - encrypted | LOG-REG | 0.80 |
| | SVM | 0.80 |
| | RF | 0.74 |
| | ACTR-R | 0.88 |
| | ACTR-IB | 0.90 |

MetaSploit:

For the MetaSploit dataset the family prediction results were as follows. ACTR-IB outperformed LOG-REG 0.8 vs 0.7, SVM 0.8 vs 0.72, RF 0.8 vs 0.72 and ACTR-R 0.8 vs 0.71 (t (158)≥2.53, p≤0.01).

Task Prediction without Inferring Families:

In the proposed models the malware family is inferred first and then the tasks associated with that family are predicted. However, differences over "ground truth" for malware families in the cyber-security community calls for a direct inference of tasks without dependence on family prediction. In this section, the models are adapted to predict tasks directly without inferring the family.

Figure 15:
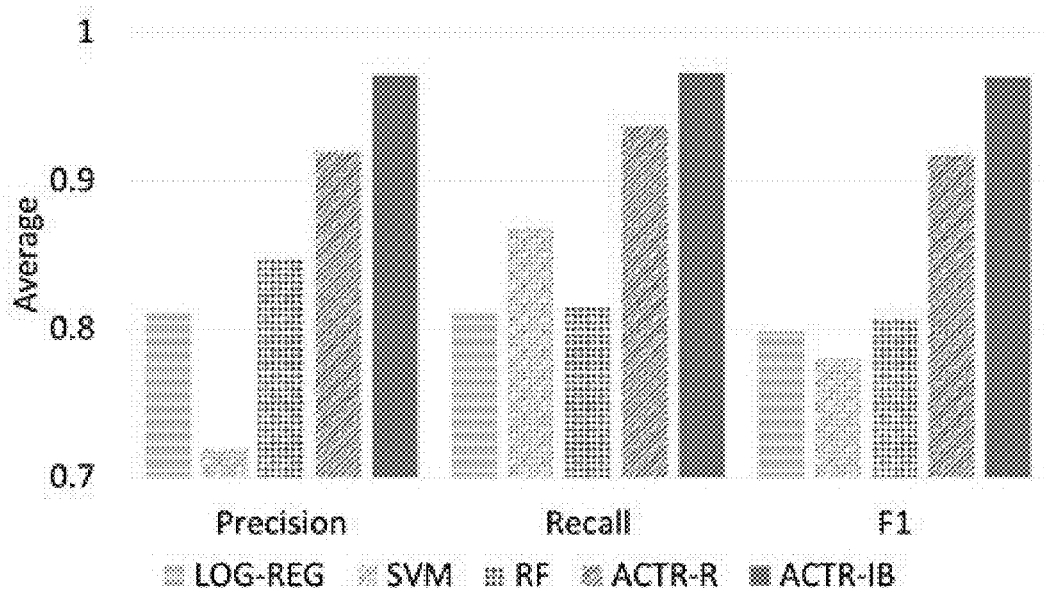
FIG. 15 is a graph illustrating Average Precision, Recall, and F1 comparisons for LOG-REG, SVM, RF, ACTR-R and ACTR-IB for Mandiant without inferring families.
Figure 16A:
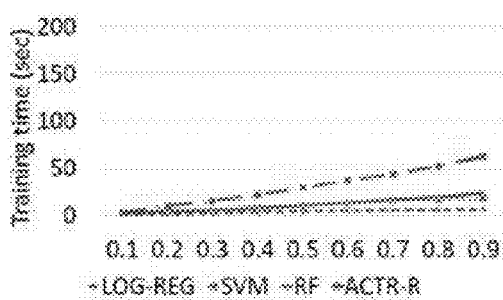
FIG. 16A is a graph showing the training time for LOG-REG, SVM, RF and ACTR-R with inferring families
Figure 16B:
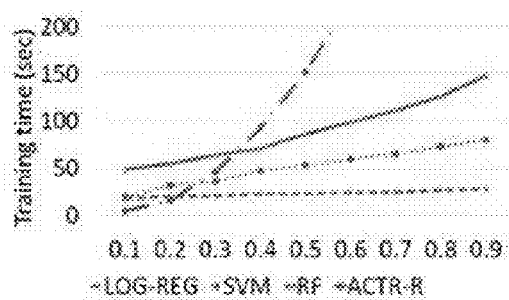
FIG. 16B is a graph showing the training time for LOG-REG, SVM, RF and ACTR-R without inferring families.

FIG. 15 shows the performance of the cognitive and machine learning models without inferring the families. There is no difference in the performance of ACTR-IB and ACTR-R approaches as compared to FIG. 1 where we use families. On the other hand direct task prediction reduces the F1 measure of machine learning techniques on average by almost 0.1. This is due to the fact that, now instead of having a single classifier for each family multiple classifiers are used for each task that a malware sample is designed to perform. This not only degrades the performance but also adds to the training time for these methods (including the ACT-R rule-based approach). The training time is compared with increase in training data for task prediction with/ without inferring families. Inferring families first reduces the training time (see FIG. 16A). On the other hand predicting tasks directly significantly increases the training time for the machine learning methods along with the rule-based ACT-R approach (FIG. 16B). Due to the issues with respect to performance and training time, inferring families are considered first for all the discussed experiments. An important point to note is this has no effect on the Instance-based model for both performance and computation time.

In conclusion, for task prediction the intermediate step of family prediction is not required. As shown in the results there is no impact on the performance of cognitive models (It does increase the training time for ACTR-R model). On the other hand machine learning approaches suffer in both performance and computation time. Also, security analysts might find knowing the family a piece of malware belongs to useful in understanding the malware, hence this intermediate step is kept in our proposed cognitive models.

Figure 17:
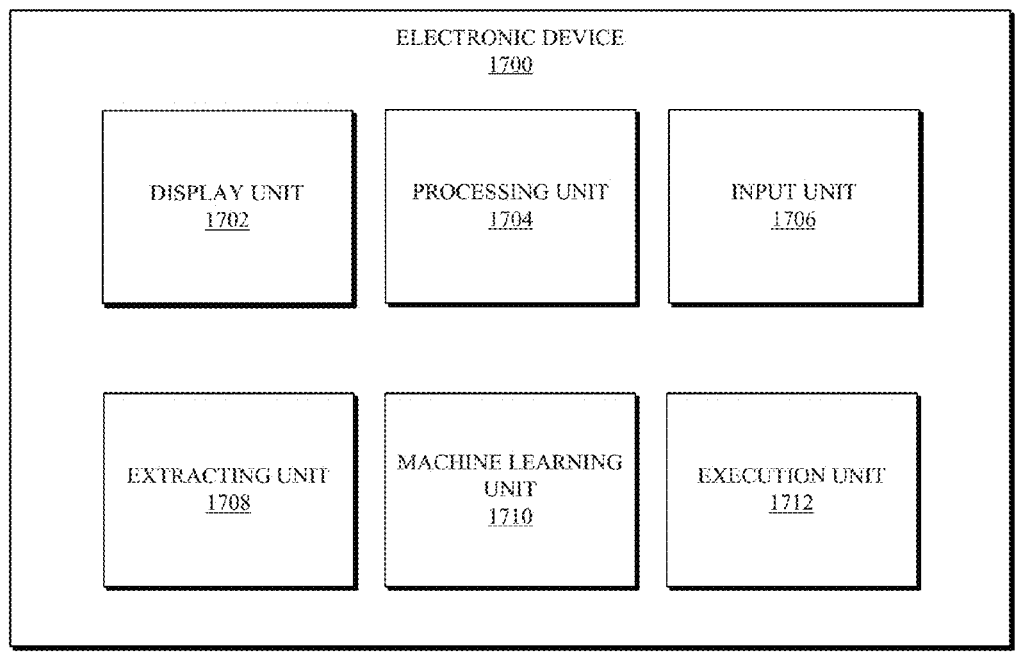
FIG. 17 is a simplified block diagram of an electronic device.

Turning to FIG. 17, an example electronic device 1700 including operational units 1702-1712 arranged to perform various operations of the presently disclosed technology is shown. The operational units 1702-1712 of the device 1700 are implemented by hardware or a combination of hardware and software to carry out the principles of the present disclosure. It will be understood by persons of skill in the art that the operational units 1702-1712 described in FIG. 17 may be combined or separated into sub-blocks to implement the principles of the present disclosure. Therefore, the description herein supports any possible combination or separation or further definition of the operational units 1702-1712.

In one implementation, the electronic device 1700 includes a display unit 1702 configured to display information, such as a graphical user interface, and a processing unit 1704 in communication with the display unit and an input unit 1706 configured to receive data from one or more input devices or systems. Various operations described herein may be implemented by the processing unit 1704 using data received by the input unit 1706 to output information for display using the display unit 1702. In one particular implementation, a predicted malware type for a received malware instance is displayed on the display unit 1702 for a user of the electronic device 1700 to view.

Additionally, in one implementation, the electronic device 1700 includes units implementing the operations described herein. For example, the electronic device 1700 may include an extracting unit 1708 for extracting attributes from a received instance of malware. A machine learning unit 1710 may also be included in the electronic device 1700 to apply one or more ACT-R machine learning techniques on the extracted attributes of the received malware. Further still, the electronic device 1700 may include an execution unit 1712 to at least partially execute a received malware instance on a host device. Additional units may also be included but are not shown.

Figure 18:
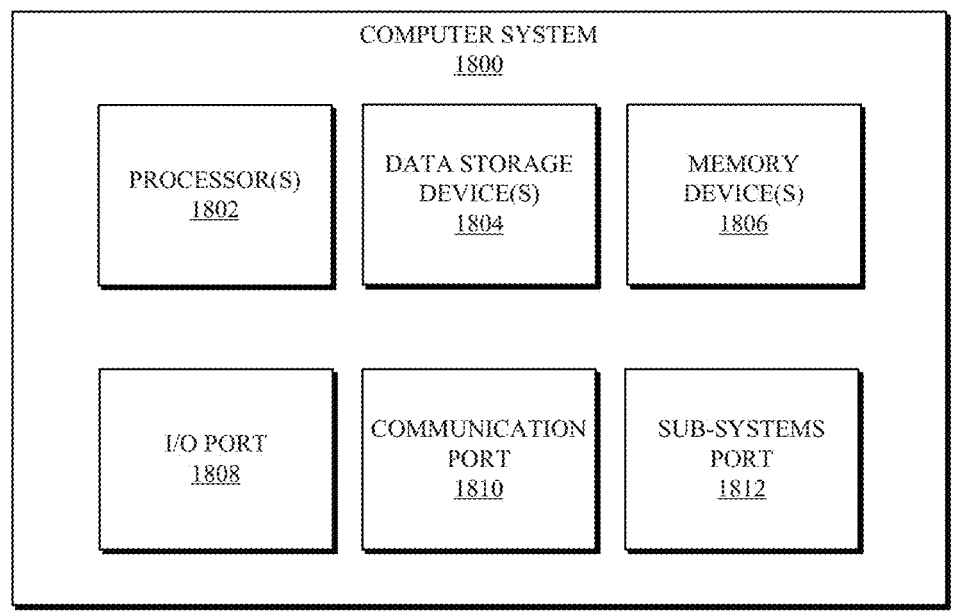
FIG. 18 is a simplified block diagram of a computer system.

Referring to FIG. 18, a detailed description of an example computing system 1800 having one or more computing units that may implement various systems and methods discussed herein is provided. The computing system 1800 may be applicable to the system described herein. It will be appreciated that specific implementations of these devices may be of differing possible specific computing architectures not all of which are specifically discussed herein but will be understood by those of ordinary skill in the art.

The computer system 1800 may be a computing system is capable of executing a computer program product to execute a computer process. Data and program files may be input to the computer system 1800, which reads the files and executes the programs therein. Some of the elements of the computer system 1800 are shown in FIG. 18, including one or more hardware processors 1802, one or more data storage devices 1804, one or more memory devices 1806, and/or one or more ports 1808-1812. Additionally, other elements that will be recognized by those skilled in the art may be included in the computing system 1800 but are not explicitly depicted in FIG. 18 or discussed further herein. Various elements of the computer system 1800 may communicate with one another by way of one or more communication buses, point-to-point communication paths, or other communication means not explicitly depicted in FIG. 18.

The processor 1802 may include, for example, a central processing unit (CPU), a microprocessor, a microcontroller, a digital signal processor (DSP), and/or one or more internal levels of cache. There may be one or more processors 1802, such that the processor comprises a single central-processing unit, or a plurality of processing units capable of executing instructions and performing operations in parallel with each other, commonly referred to as a parallel processing environment.

The computer system 1800 may be a conventional computer, a distributed computer, or any other type of computer, such as one or more external computers made available via a cloud computing architecture. The presently described technology is optionally implemented in software stored on the data stored device(s) 1804, stored on the memory device(s) 1806, and/or communicated via one or more of the ports 1808-1812, thereby transforming the computer system 1800 in FIG. 18 to a special purpose machine for implementing the operations described herein. Examples of the computer system 1800 include personal computers, terminals, workstations, mobile phones, tablets, laptops, personal computers, multimedia consoles, gaming consoles, set top boxes, and the like.

The one or more data storage devices 1804 may include any non-volatile data storage device capable of storing data generated or employed within the computing system 1800, such as computer executable instructions for performing a computer process, which may include instructions of both application programs and an operating system (OS) that manages the various components of the computing system 1800. The data storage devices 1804 may include, without limitation, magnetic disk drives, optical disk drives, solid state drives (SSDs), flash drives, and the like. The data storage devices 1804 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 1806 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 1804 and/or the memory devices 1806, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 1800 includes one or more ports, such as an input/output (I/O) port 1808, a communication port 1810, and a sub-systems port 1812, for communicating with other computing, network, or vehicle devices. It will be appreciated that the ports 1808-1812 may be combined or separate and that more or fewer ports may be included in the computer system 1800.

The I/O port 1808 may be connected to an I/O device, or other device, by which information is input to or output from the computing system 1800. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 1800 via the I/O port 1808. Similarly, the output devices may convert electrical signals received from computing system 1800 via the I/O port 1808 into signals that may be sensed as output by a human, such as sound, light, and/or touch. The input device may be an alphanumeric input device, including alphanumeric and other keys for communicating information and/or command selections to the processor 1802 via the I/O port 1808. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

In one implementation, a communication port 1810 is connected to a network by way of which the computer system 1800 may receive network data useful in executing the methods and systems set out herein as well as transmitting information and network configuration changes determined thereby. Stated differently, the communication port 1810 connects the computer system 1800 to one or more communication interface devices configured to transmit and/or receive information between the computing system 1800 and other devices by way of one or more wired or wireless communication networks or connections. For example, the computer system 1800 may be instructed to access information stored in a public network, such as the Internet. The computer 1800 may then utilize the communication port to access one or more publicly available servers that store information in the public network. In one particular embodiment, the computer system 1800 uses an Internet browser program to access a publicly available website. The website is hosted on one or more storage servers accessible through the public network. Once accessed, data stored on the one or more storage servers may be obtained or retrieved and stored in the memory device(s) 1806 of the computer system 1800 for use by the various modules and units of the system, as described herein.

Examples of types of networks or connections of the computer system 1800 include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 1810 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 1810 may communicate with an antenna for electromagnetic signal transmission and/or reception.

The computer system 1800 may include a sub-systems port 1812 for communicating with one or more additional systems to perform the operations described herein. For example, the computer system 1800 may communicate through the sub-systems port 1812 with a large processing system to perform one or more of the calculations discussed above.

The system set forth in FIG. 18 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

Figure 19:
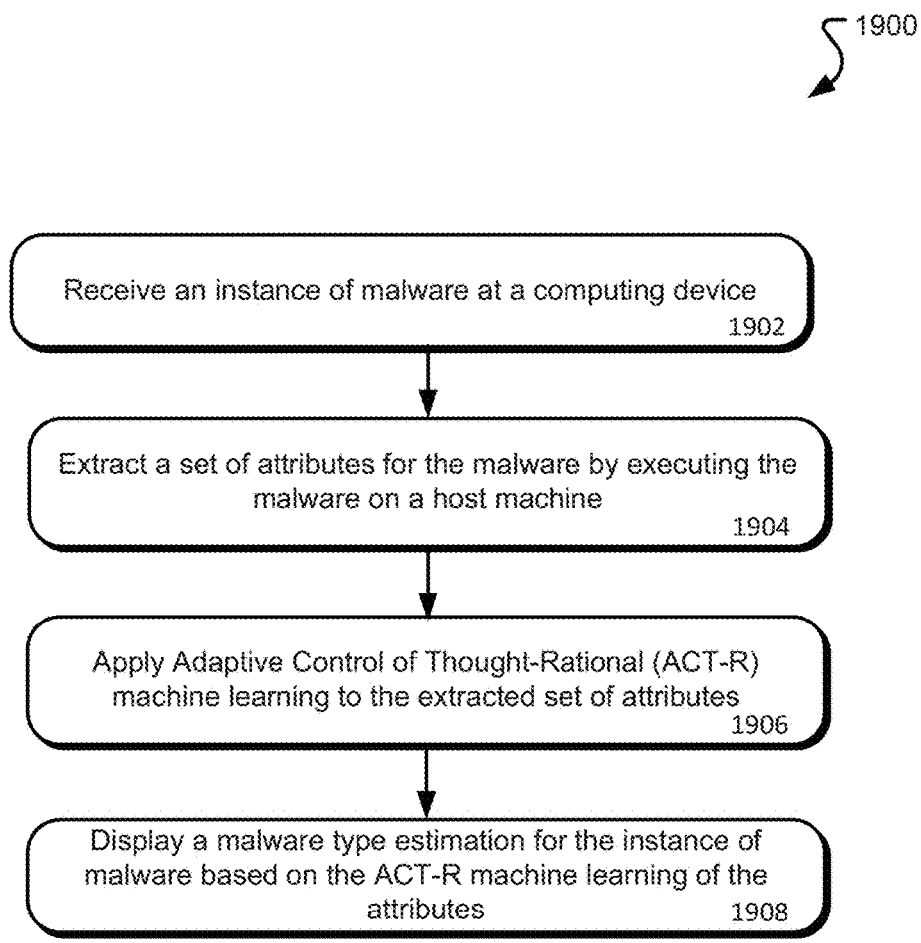
FIG. 19 is a flowchart of an exemplary method of present disclosure.

FIG. 19 is a flowchart of an exemplary method of present disclosure. The operations of the illustrated method 1900 may be performed by a computing system, such as that described in relation to FIG. 18. In operation 1902, the computing system receives an instance of malware at the computing system. In operation 1904, the computing system may utilize an extraction unit to extract one or more attributes of the malware instance. These attributes are then utilized by the computing system during application of a machine learning process or technique in operation 1906. In one particular embodiment, the machine learning process includes an ACT-R technique as described above. Through the machine learning technique, the computing system may estimate a type of malware and display the estimated result on a display device in operation 1908.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for malware task prediction, the method comprising:
    configuring a computing device, for:
        accessing training data from a memory in operable communication with the computing device, the training data represented as sample malware attributes associated with a plurality of sample malware instances, the sample malware attributes defining binary features of the plurality of sample malware instances;
        accessing data associated with a malware utilizing the computing device;
        applying a parser to the data associated with the malware to extract a set of attributes using the computing device, the set of attributes defining binary features associated with the malware; and
        applying a machine learning cognitive model to the extracted set of attributes and the sample malware attributes, utilizing the computing device, to predict one or more tasks associated with the malware, at least by computing a similarity value between the malware and a sample instance of the plurality of sample malware instances,
        wherein the machine learning cognitive model is data driven and utilizes mechanisms of an Adaptive Control of Thought-Rational cognitive architecture, and
        wherein prediction of the one or more tasks by the computing device applying the machine learning cognitive model assists to define task activity the malware is designed to perform which improves accuracy associated with identification of the malware.

2. The method of claim 1, wherein the similarity value is derived by computing an activation strength of the malware with each of the plurality of sample malware instances.

3. The method of claim 2, wherein computing the activation strength further comprises utilizing a base-level activation function that is set to a base level constant.

4. The method of claim 2, wherein computing the activation strength further comprises applying a spreading activation function that is a measure of uniqueness of the set of attributes associated with the malware relative to the sample malware attributes.

5. The method of claim 2, wherein the activation strength is computed as:

$$A_i = B_i + S_i + P_i$$

where $A_i$ is the activation strength, $B_i$ is a base-level activation, $S_i$ is a spreading activation, and $P_i$ is a partial matching score.

6. The method of claim 1, further comprising utilizing a spreading activation by computing a fan for each attribute of the set of attributes relative to the sample malware attributes.

7. The method of claim 1, further comprising utilizing an iterative learning method that reflects a cognitive process of accumulating experiences defined by the sample malware attributes.

8. The method of claim 1, further comprising assigning a probability to the one or more tasks and returning tasks of the one or more tasks with a sum probability greater than a predefined threshold.

9. One or more non-transitory tangible computer-readable storage media storing computer-executable instructions for performing a computer process on a machine, the computer process comprising:
    accessing training data represented as sample malware attributes associated with a plurality of sample malware instances stored in a memory, the sample malware attributes defining binary features of the plurality of sample malware instances;
    accessing data associated with a malware;
    applying a parser to the data associated with the malware to extract a set of attributes, the set of attributes defining binary features associated with the malware; and
    applying a machine learning cognitive model to the extracted set of attributes and the sample malware attributes to predict one or more tasks associated with the malware, at least by computing a similarity value between the malware and a sample instance of the plurality of sample malware instances,
    wherein the machine learning cognitive model is data driven and utilizes mechanisms of an Adaptive Control of Thought-Rational cognitive architecture, and
    wherein prediction of the one or more tasks by applying the machine learning cognitive model assists to define task activity the malware is designed to perform which improves accuracy associated with identification of the malware.

* * * * *